(12) United States Patent
Wu et al.

(10) Patent No.: US 11,975,621 B2
(45) Date of Patent: May 7, 2024

(54) DOUBLE SOLENOID EV-DWPT SYSTEM AND PARAMETER OPTIMIZATION METHOD THEREOF

(71) Applicants: ELECTRIC POWER SCIENCE RESEARCH INSTITUTE OF GUANGXI POWER GRID CO., LTD., Guangxi (CN); CHONGQING UNIVERSITY, Chongqing (CN)

(72) Inventors: Xiaorui Wu, Guangxi (CN); Yue Sun, Chongqing (CN); Xiaofei Li, Chongqing (CN); Jing Xiao, Guangxi (CN); Shaonan Chen, Guangxi (CN); Yue Zuo, Chongqing (CN); Yuhong Mo, Guangxi (CN); Ning Wu, Guangxi (CN); Wenlan Gong, Guangxi (CN); Shuai Han, Guangxi (CN); Weidong Chen, Guangxi (CN); Min Guo, Guangxi (CN); Xiaoxuan Guo, Guangxi (CN); Chunsen Tang, Chongqing (CN)

(*) Notice: Subject to any disclaimer, the term of this patent is extended or adjusted under 35 U.S.C. 154(b) by 0 days.

(21) Appl. No.: 18/512,048

(22) Filed: Nov. 17, 2023

(65) Prior Publication Data
US 2024/0100972 A1    Mar. 28, 2024

Related U.S. Application Data

(63) Continuation of application No. PCT/CN2023/108117, filed on Jul. 19, 2023.

(51) Int. Cl.
*B60L 53/122* (2019.01)
*B60L 53/39* (2019.01)
(Continued)

(52) U.S. Cl.
CPC ............. *B60L 53/122* (2019.02); *B60L 53/39* (2019.02); *H01F 27/24* (2013.01); *H01F 38/14* (2013.01); *H02J 50/90* (2016.02)

(58) Field of Classification Search
CPC ........ B60L 53/122; B60L 53/39; H01F 27/24; H01F 38/14; H02J 50/10; H02J 50/90
See application file for complete search history.

(56) References Cited

U.S. PATENT DOCUMENTS

| | | | |
|---|---|---|---|
| 2015/0061402 A1* | 3/2015 | Ichikawa | H02J 50/70 307/104 |
| 2022/0052555 A1* | 2/2022 | Nagaoka | H02J 50/60 |
| 2022/0199302 A1* | 6/2022 | Beddingfield | H01F 27/38 |

FOREIGN PATENT DOCUMENTS

| | | |
|---|---|---|
| CN | 104426247 A | 3/2015 |
| CN | 113904460 A | 1/2022 |

(Continued)

OTHER PUBLICATIONS

Tang et al., Google Patents Machine translation of CN114161952A, Accessed Nov. 15, 2023, pp. 1-21.

(Continued)

*Primary Examiner* — Rexford N Barnie
*Assistant Examiner* — Rasem Mourad
(74) *Attorney, Agent, or Firm* — Addison D. Ault; Richard P. Moerschell; IPGentleman Intellectual Property Services, LLC

(57) ABSTRACT

The present disclosure relates to the field of EV-DWPT (electric vehicle dynamic wireless power transfer), and specifically discloses a double solenoid EV-DWPT system and a parameter optimization method thereof. The system is provided with a magnetic coupling mechanism, comprising a transmitting structure and a receiving structure. The transmitting structure includes a plurality of double solenoid transmitting rails arranged equidistantly along a road direc- (Continued)

tion. Each double solenoid transmitting rail includes a square tubular magnetic core perpendicular to the road surface, and transmitting solenoids wound spirally using one and the same Litz wire wound in opposite directions. The present disclosure proposes a magnetic coupling mechanism with a double solenoid structure, provides a specific parameter optimization design method, completes the analysis of the system power transmission topology and the electrical parameter design, greatly reduces power fluctuations of the system rail switching domain, and improves the system's anti-offset capability.

8 Claims, 26 Drawing Sheets

(51) Int. Cl.
*H01F 27/24* (2006.01)
*H01F 38/14* (2006.01)
*H02J 50/90* (2016.01)

(56) References Cited

FOREIGN PATENT DOCUMENTS

| CN | 114161952 A | * | 3/2022 |
| CN | 114161952 A | | 3/2022 |

OTHER PUBLICATIONS

Ichikawa et al., Google Patents Machine translation of CN104426247A, Accessed Nov. 15, 2023, pp. 1-15.
Yin et al., Google Patents Machine translation of CN113904460A, Accessed Nov. 15, 2023, pp. 1-9.
CNIPA Office Action, CN202210851041.6 dated Apr. 23, 2023, pp. 1-7.
CNIPA Office Action, CN202210851041.6 dated Apr. 23, 2023, English translation, accessed Nov. 15, 2023 from Global Dossier, pp. 1-5.

* cited by examiner (a) rail switching domain      (b) lateral offset (a) schematic structural view of pickup coil   (b) schematic structural view of transmitting rail (a) energy pickup coil (b) energy transmitting rail (a) $M_{p1s}$, $M_{p2s}$ change trend diagram  (b) change trend of total mutual inductance $M$

_US 11,975,621 B2_

DOUBLE SOLENOID EV-DWPT SYSTEM AND PARAMETER OPTIMIZATION METHOD THEREOF

CROSS-REFERENCE TO RELATED APPLICATION

This application is a Section 371 National Stage Application of International Application No. PCT/CN2023/108117, filed on Jul. 19, 2023, entitled "Double Solenoid EV-DWPT System and Parameter Optimization Method Thereof", which claims priority to Chinese Application No. 202210851041.6, filed on Jul. 20, 2022, incorporated herein by reference in their entirety.

TECHNICAL FIELD

The present disclosure relates to the field of EV-DWPT (electric vehicle dynamic wireless power transfer), and in particular to a double solenoid EV-DWPT system and a parameter optimization method thereof.

BACKGROUND

The traditional power replenishment method of electric vehicles (EVs) adopts wired charging mode, the charging process requires the cooperation of people, meanwhile the inevitable aging of system lines and the risk of short circuit when charging on rainy days greatly reduce safety and reliability of power supply of the equipment. MC-WPT technology can solve the above problems well and has been widely researched and applied in recent years. When the MC-WPT technology is applied to the field of electric vehicles, it mainly includes two modes: static wireless power transfer (static wireless power transmission) and dynamic wireless power transfer. Electric vehicle static wireless power transfer (EV-SWPT) refers to that the electric vehicle is replenished/charged with electric energy when it is parked in a parking space or a dedicated parking site, the electric vehicle is relatively stationary during the entire charging process; while electric vehicle dynamic wireless power transfer (EV-DWPT) refers to that the electric vehicle is charged wirelessly with electric energy when it is driving, the electric vehicle does not need to carry large-capacity energy storage batteries in this mode, saving vehicle space and reducing vehicle weight and vehicle costs.

The power supply rails of the EV-DWPT system have two modes: long rail power supply and distributed short rail power supply. The long rail mode system usually consists of a set of primary side power conversion device, long rails, energy receiving coils and secondary side power conversion device. Its structure and control strategy are simple, and the constructive cost is low. However, since the length of the rail is generally tens of meters, the equal series resistance (ESR) of the rail is very large, and there is a large magnetic leakage situation on the road section where there are no vehicles. This causes the system coupling coefficient and transmission efficiency to be reduced and it will cause serious electromagnetic pollution and harm the health of pedestrians, animals and plants on the road. In actual engineering applications, the EV-DWPT system often adopts the distributed short rail power supply mode. Different from the long rail power supply mode, the primary side of the system consists of multiple sets of primary side power conversion devices and multiple sections of distributed short rails. The work status of each rail section is controlled by a separate set of electric energy conversion devices. When the vehicle travels above a certain section of rail, one or several corresponding section rails start working, and the other rails are in a dormant or standby state. The distributed short rail power supply mode has high coupling coefficient and system transmission efficiency, and small electromagnetic radiation, but the constructive cost is high. In addition, the switching control method of the distributed short rails is relatively more complicated. More importantly, the distributed short rail has a serious mutual inductance drop in the rail switching domain, it causes a drop in transmission power, it is not conducive to the efficient and reliable power supply of electric vehicles during driving, and seriously affects the service life of the on-board batteries.

Relevant scholars and teams at home and abroad have conducted a lot of research on dynamic wireless power supply for electric vehicles on distributed short rails, but there are still the following problems: first, additional detection circuits and control circuits increase the complexity of the system; second, it is difficult to meet the control requirements of the EV-DWPT system in high-speed motion due to complex control strategies; third, the multi-channel EV-DWPT system will undergo cross-coupling when lateral offset occurs, causing the system to be detuned and unable to work properly.

SUMMARY

The present disclosure provides a double solenoid EV-DWPT system and a parameter optimization method thereof. The technical problem to be solved is to design an EV-DWPT system with a simple structure, strong universality, and capable of effectively suppressing output power fluctuations of the system.

In order to solve the above technical problems, the present disclosure provides a double solenoid EV-DWPT system, comprising a primary side power conversion assembly, a magnetic coupling mechanism, and a secondary side power conversion assembly, the magnetic coupling mechanism comprising a transmitting structure and a receiving structure, wherein:

the transmitting structure comprises a plurality of double solenoid transmitting rails arranged equidistantly along a road direction, each of the double solenoid transmitting rails comprises a square tubular magnetic core perpendicular to a road surface, and an inner energy transmitting solenoid and an outer energy transmitting solenoid wound spirally on an inner wall and an outer wall of the square tubular magnetic core respectively, the inner energy transmitting solenoid and the outer energy transmitting solenoid use one and the same Litz wire, but are wound in opposite directions;

the receiving structure comprises a hierarchically arranged pickup coil, a receiving-end magnetic core and a metal shielding plate, and the pickup coil is of a square annular structure;

the square tubular magnetic core comprises an inner square tubular magnetic core, a middle square tubular magnetic core and an outer square tubular magnetic core that are partitioned, the inner energy transmitting solenoid is wound on an inner wall of the inner square tubular magnetic core, the outer energy transmitting solenoid is wound around an outer wall of the outer square tubular magnetic core;

a square protrusion is provided at a center of the receiving-end magnetic core, and the square protrusion fits into a square gap in a center of the pickup coil; the number of turns of the outer energy transmitting solenoid is $n_1$, and the number of turns of the pickup coils is $n_2$, wherein $n_1$ and $n_2$ are determined through the following steps:

A1: setting a target mutual inductance value $M_{min}$ and a transmission distance h;

A2: with reference to dimensions of the outer square tubular magnetic core and the receiving-end magnetic core, determining a maximum value $(n_1)_{max}$ of $n_1$ and a maximum value $(n_2)_{max}$ of $n_2$;

A3: letting $n_1=n_2=1$, and using COMSOL finite element simulation software to calculate a mutual inductance M of the magnetic coupling mechanism;

A4: determine whether M is greater than $M_{min}$, if so, record the current value of $n_1$ and $n_2$; if not, go to the next step;

A5: adding 1 to $n_2$, that is, $n_2=n_2+1$;

A6: determining whether the current $n_2$ is greater than $(n_2)_{max}$, if not, return to the step A4; if so, proceed to the next step;

A7: letting $n_2=1$, adding 1 to $n_1$, that is, $n_1=n_1+1$;

A8: determining whether the current $n_1$ is greater than $(n_1)_{max}$, if not, return to the step A4; if so, the design fails.

According to some embodiments of the present disclosure, after $n_1$ and $n_2$ are determined, a coil size of the inner energy transmitting solenoid is determined through the following steps:

B1: determining an initial value of the coil size with reference to a system power level, the number of turns of coils in the transmitting rails and a maximum drop $\Delta M_{max}$ of mutual inductance at offset;

B2: simulating anti-offset characteristics of the system;

B3: analyzing and determining whether the drop $\Delta M$ of mutual inductance at offset is less than $\Delta M_{max}$, if so, record the current coil size; if not, adjust the coil size and return to the step B2.

According to some embodiments of the present disclosure, transmitting coils of the inner energy transmitting solenoid and the outer energy transmitting solenoid emission coil, and the pickup coil are all wound and formed from Litz wires with 0.1 mm*1000 strands and 5 mm outer diameter; the square tubular magnetic core and the receiving-end magnetic core are made of a core material selected from PC95 manganese zinc ferrite.

According to some embodiments of the present disclosure, the primary side power conversion assembly comprises DC power supplies connected in sequence, a plurality of high-frequency inverters connected in parallel to the DC power supplies, and first LCC primary side resonant networks and second LCC primary side resonant networks connected in parallel to the high-frequency inverters, the first LCC primary side resonant network and the second LCC primary side resonant network respectively connect two adjacent double solenoid transmitting rails;

the secondary side power conversion assembly comprises a LCC secondary side resonant network, a rectifier filter circuit and a load circuit sequentially connected.

According to some embodiments of the present disclosure, resonant inductors in the first LCC primary side resonance network, the second LCC primary side resonance network and the LCC secondary side resonance network are equivalently replaced by an inductor and a capacitor in series connection.

According to some embodiments of the present disclosure, a self-inductance value $L_{f1}$ of the resonant inductor in the first LCC primary side resonant network is equal to a self-inductance value $L_{f2}$ of the resonant inductor in the second LCC primary side resonant network, and equal to $L_{f12}$.

The present disclosure also provides a parameter optimization method of a double solenoid EV-DWPT system, comprising:

Step I: according to system requirements, determining a system input voltage $U_i$, an output load equivalent resistance $R_L$, an output voltage $U_o$ and setting a system operating frequency f;

Step II: with a goal of optimizing efficiency, determining a value of $L_{f3}$ with reference to a wire diameter of the pickup coil, a current expression $I_s=R_{eq}(M_{p1s}+M_{p2s})U_i/\omega^2L_{f12}L_{f3}^2$ and an output current expression $I_3=(M_{p1s}+M_{p2s})U_i/j\omega L_{f12}L_{f3}$, where $M_{p1s}+M_{p2s}$ is mutual inductance of the pickup coil and two adjacent double solenoid transmitting rails, $\omega=2\pi f$ is an operating angular frequency of the system, and $L_{f3}$ is the self-inductance value of the resonant inductor in the LCC secondary side resonant network;

Step III: determining values of $L_{f1}$ and $L_{f2}$ with reference to a wire diameter of the double solenoid transmitting rails and a current expression $I_p=U_i/\omega L_{fi}$, where i=1, 2;

Step IV: setting a system output power $P_o$, and initially determining a value range of the mutual inductance $M_{p1s}+M_{p2s}$ of a rail center area and a rail switching domain of the magnetic coupling mechanism based on an output power expression $$P_o = \frac{(M_{p1s}+M_{p2s})^2\omega^2 L_{f3}^2 R_{eq}}{L_{f12}^2(\omega^2 L_{f3}^2 + R_{eq}R_s)^2}|U_i|^2,$$

where $R_s$ is an internal resistance of the pickup coil, and $R_{eq}$ is an equivalent resistance equivalent to the rectifier filter circuit and the load circuit;

Step V: using Comsol simulation software to optimize a design of the magnetic coupling mechanism, and obtaining $M_{p1s}+M_{p2s}$ and a cross-mutual inductance $M_{p1p2}$ of two adjacent double solenoid transmitting rails through simulation;

Step VI: determining through calculation whether a value of the mutual inductance $M_{p1s}+M_{p2s}$ meets system output power requirements, and qualitatively and quantitatively analyzing whether a fluctuation of $M_{p1s}+M_{p2s}$ meets a standard, if the conditions are met, proceed to the next step, otherwise, adjust the number of turns of coil and magnetic core distribution of the magnetic coupling mechanism, and repeat the step V;

Step VII: substituting the self-inductances $L_{p1}$ and $L_{p2}$ of the two adjacent double solenoid transmitting rails and their mutual inductance $M_{p1p2}$ into a formula $$\begin{cases} C_{p1} = \dfrac{1}{\omega^2(L_{p1}-L_{f1}-M_{p1p2})} \\ C_{p2} = \dfrac{1}{\omega^2(L_{p2}-L_{f2}-M_{p1p2})} \end{cases},$$

to calculate and analyze sensitivity of corresponding series compensation capacitors $C_{p1}$ and $C_{p2}$, if the sensitivity meets system design requirements, then go to the next step, otherwise, adjust the size, number of turns of coil and magnetic core distribution of the magnetic coupling mechanism, and repeat the step V;

Step VIII: recording all system parameters and completing system parameter design.

According to some embodiments of the present disclosure, in the step IV, the rail center area of the magnetic coupling mechanism is directly above the double solenoid transmitting rail, the rail switching domain is an area between two adjacent rail center areas.

The present disclosure provides a double solenoid EV-DWPT system and its parameter optimization method, proposes a magnetic coupling mechanism of double solenoid structure, and provides a specific parameter optimization design method, completing the analysis of the power transmission topology and the electrical parameter design, greatly reducing power fluctuations of the system rail switching domain, and improving the system's anti-offset capability.

DETAILED DESCRIPTION OF EMBODIMENTS

The embodiments of the present disclosure will be explained in detail below with reference to the accompanying drawings. The embodiments are given for illustrative purposes only and cannot be understood as limiting the present disclosure. The accompanying drawings are only for reference and illustration and do not constitute a limitation on the patent protection scope of the present disclosure. Many changes may be made to the present disclosure without departing from the spirit and scope of the present disclosure.

Figure 1:
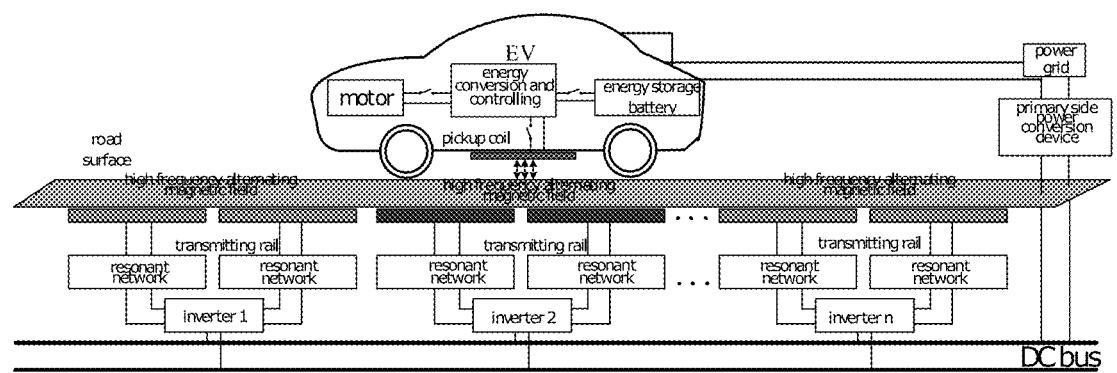
FIG. 1 is an overall structural diagram of a distributed short rail EV-DWPT system according to an embodiment of the present disclosure.

The EV-DWPT system based on distributed short rails adopts a multi-transmission parallel structure. In order to reduce system construction costs and reduce the number of inverters, the present disclosure designs a mode in which two sets of resonance compensation networks and rails are driven by the same inverter. The overall structure of the EV-DWPT system is shown in FIG. 1. It should be noted that, due to the limitation of the maximum operating frequency of electronic switching devices, the switching speed of the rail can generally only reach the μs level. Considering that the detection of vehicle position and the control of rail switching require a certain response time, the length of the transmitting rails should be much larger than the length of the pickup coil.

Figure 2:
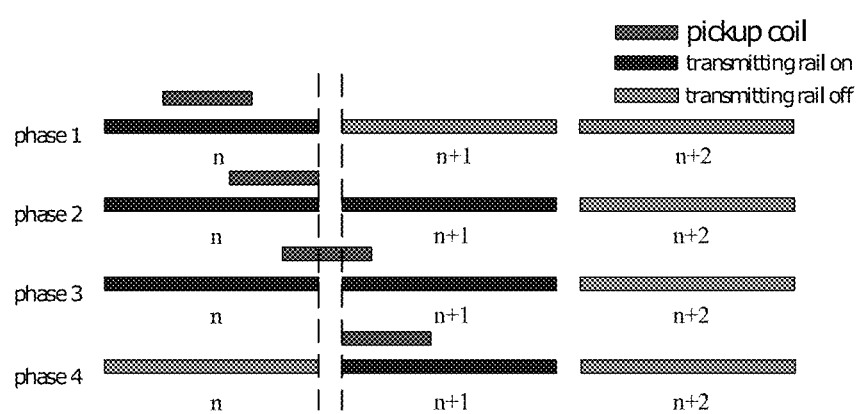
FIG. 2 is a rail switching timing logic diagram according to an embodiment of the present disclosure.

In order to obtain a stable mutual inductance M, ensure that the electric vehicle continuously and smoothly picks up electric energy during driving, and reduce the overall loss of the system and reduce electromagnetic radiation, the rail status must be controlled in sections and time-sharing according to the position of the pickup coil, that is, it is ensured that, at a certain moment, one or a few sets of rails located under the electric vehicle are on, while the remaining rails are on standby. The specific switching control timing is shown in FIG. 2.

In the present disclosure, the area directly above the rail is defined as a rail center area, and a transition area between the rails is defined as a rail switching domain. The working mode of rail switching can be divided into the following four stages according to time:

Stage 1: At the current moment, the electric vehicle is in the charging area of the n-th rail. The inverter numbered n controls the corresponding rail to start working, and the remaining rails are on standby. The pickup coil is provided with electric energy by the transmitting rail n;

Stage 2: The electric vehicle is about to enter the charging area of the (n+1)-th rail. The inverter numbered (n+1) receives the vehicle position detection signal and starts working. At this time, the pickup coil is still in the area where the transmitting rail n is located, and is provided with electrical energy by the transmitting rail n;

Stage 3: At this time, the magnetic field of the rail (n+1) has been completely established. The electric vehicle travels to the switching area of rail n and rail (n+1), and the pickup coil is provided with electrical energy by the transmitting rail n and the transmitting rail (n+1) together.

Stage 4: The electric vehicle exits the rail n, and at this time, the inverter numbered n receives a vehicle exit signal, the status of the corresponding rail switches to standby, and the pickup coil is provided with power by the transmitting rail (n+1).

By analogy, the switch-on and switch-off of the corresponding transmitting rail is controlled based on the real-time position of the electric vehicle, and the magnetic field is established before the vehicle enters the next section of the transmitting rail to maintain the stability of the mutual inductance M to the maximum extent and ensure continuous and smooth pickup of electrical energy of the electric vehicle during driving. It also reduces the impact of electromagnetic radiation on the surrounding environment and improves the overall efficiency of the system.

Figure 3:
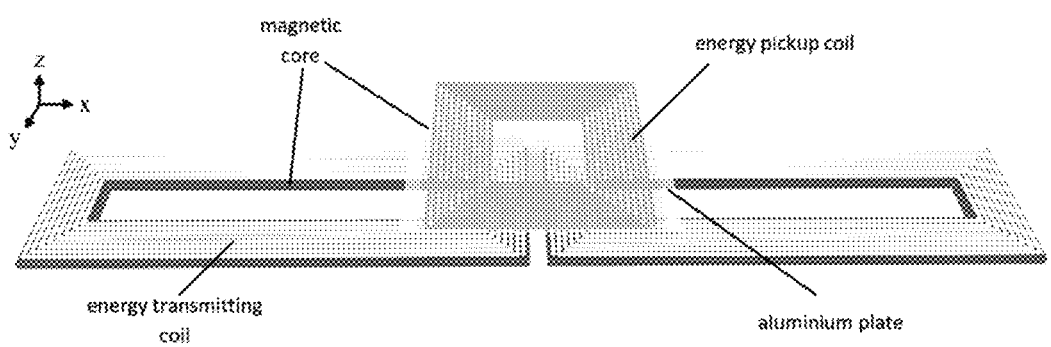
FIG. 3 is a schematic diagram of a planar rectangular magnetic coupling mechanism according to an embodiment of the present disclosure.

Segmented (In-sections) and time-sharing switching control of the transmitting rail status can ensure that, when the pickup coil is located in the rail switching domain, the energy is provided by multiple adjacent transmitting rails at the same time, which improves the stability of the power transmission of the system to a certain extent. The study found that when the relative position of the energy pickup coil and the transmitting rail changes, the mutual inductance of the rectangular coil is more stable than the circular coil structure, and the transmission power of the system is also more stable, that is, the magnetic coupling mechanism of the rectangular-rectangular structure has the advantageous of better output stability. The coil of the magnetic coupling mechanism of the EV-DWPT system usually adopts a planar rectangular structure, as shown in FIG. 3.

Figure 4:
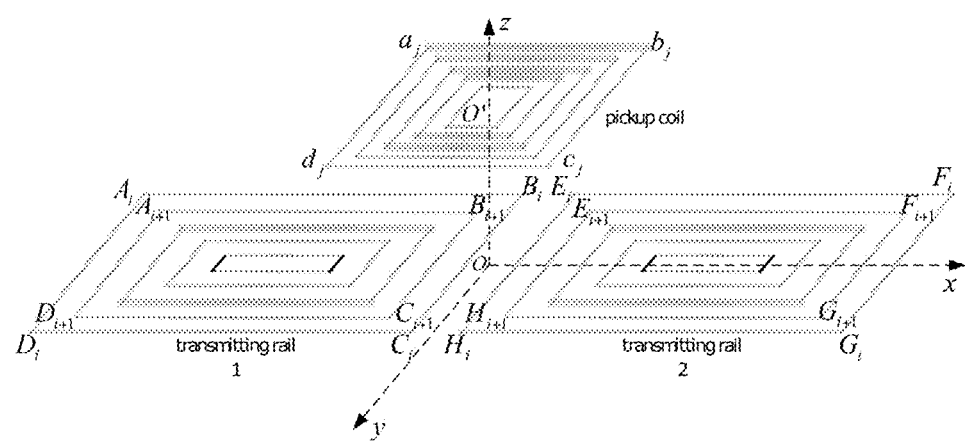
FIG. 4 is a schematic diagram of the coil of a dual-transmission magnetic coupling mechanism in a rectangular coordinate system according to an embodiment of the present disclosure.

Since the length of the transmitting rail is much longer than the energy pickup coil, the pickup coil is coupled to at most two transmitting rails during the driving of the electric vehicle. Therefore, the present disclosure uses a dual-transmission magnetic coupling mechanism as a smallest unit to study the changing rule of the mutual inductance of the pickup coil at different positions on the rail, a rectangular coordinate system of the coil of the magnetic coupling mechanism of the dual-transmission EV-DWPT system is established as shown in FIG. 4.

Assume that the length of the outermost coil of the transmitting rail is L, the width is W, and the number of turns of coil is $N_1$; and the length of the outermost coil of the pickup coil is l, the width is w, the number of turns of coil is $N_2$, and the interturn distance of the coil is d, establish a spatial rectangular coordinate system with the middle position of the two transmitting rails (i.e., the center of the rail switching domain) as the original point O, assume that the coordinate of the center of the pickup coil is O', and the vertices of the i-th turn (i=1, 2, . . . , $N_1$) of the transmitting rail 1 from outside to inside are respectively $A_i$, $B_i$, $C_i$ and $D_i$, the vertices of the i-th turn (i=1, 2, . . . $N_1$) of the transmitting rail 2 from outside to inside are respectively $E_i$, $F_i$, $G_i$ and $H_i$, and the vertices of the j-th turn (j=1, 2, . . . , $N_2$) of the pickup rail from outside to inside are respectively $a_i$, $b_i$, $c_i$ and $d_i$, then the coordinates of various vertices of the transmitting rail 1 can be listed as:

$$A_i\left[-L+d(i-1), -\frac{W}{2}+d(i-1), 0\right] \quad (1)$$
$$B_i\left[-d(i-1), -\frac{W}{2}+d(i-1), 0\right]$$
$$C_i\left[-L+d(i-1), \frac{W}{2}-d(i-1), 0\right]$$
$$D_i\left[-d(i-1), \frac{W}{2}-d(i-1), 0\right]$$

In the same way, the coordinates of various vertices of the transmitting rail 2 are:

$$E_i\left[d(i-1), -\frac{W}{2}+d(i-1), 0\right] \quad (2)$$
$$F_i\left[L-d(i-1), -\frac{W}{2}+d(i-1), 0\right]$$
$$G_i\left[d(i-1), \frac{W}{2}-d(i-1), 0\right]$$
$$H_i\left[L-d(i-1), \frac{W}{2}-d(i-1), 0\right]$$

Assuming that the coordinates of the center position of the pickup coil are O' (x, y, z), then $a_i$, $b_i$, $c_i$ and $d_i$ can be expressed as:

$$a_j\left[y-\frac{l}{2}+d(j-1), x-\frac{w}{2}+d(j-1), z\right] \quad (3)$$
$$b_j\left[y+\frac{l}{2}-d(j-1), x-\frac{w}{2}+d(j-1), z\right]$$
$$c_j\left[y-\frac{l}{2}+d(j-1), x+\frac{w}{2}-d(j-1), z\right]$$
$$d_j\left[y+\frac{l}{2}-d(j-1), x+\frac{w}{2}-d(j-1), z\right]$$

Given the coordinates of various vertices in equations (1) and (2), the i-th turns of transmitting rail 1 and transmitting rail 2 can be expressed as $l_{p1}$ (i) and $l_{p2}$ (i) respectively:

$$l_{p1}(i) = \overrightarrow{A_iB_i} + \overrightarrow{B_iC_i} + \overrightarrow{C_iD_i} + \overrightarrow{D_iA_i} \quad (4)$$

$$l_{p2}(i) = \overrightarrow{E_iF_i} + \overrightarrow{F_iG_i} + \overrightarrow{G_iH_i} + \overrightarrow{H_iE_i} \quad (5)$$

Given the coordinates of various vertices in equation (3), the j-th turn of the pickup coil can be expressed as:

$$l_s(j) = \overrightarrow{a_jb_j} + \overrightarrow{b_jc_j} + \overrightarrow{c_jd_j} + \overrightarrow{d_ja_j} \quad (6)$$

According to the Neumann mutual inductance calculation formula, the mutual inductance between the i-th turn $l_{p1}$ (i), $l_{p2}$(i) of the transmitting rail 1 and transmitting rail 2 and the j-th turn $l_s$ (j) of the pickup coil is:

$$M_1(ij) = \frac{\mu_r \mu_0}{4\pi} \int_{l_{p1}(i)} \int_{l_s(j)} \frac{dl_{p1}(i) dl_{s(j)}}{R_J} \quad (7)$$

$$M_2(ij) = \frac{\mu_r \mu_0}{4\pi} \int_{l_{p2}(i)} \int_{l_s(j)} \frac{dl_{p2}(i) dl_{s(j)}}{R_{ij}} \quad (8)$$

where $\mu_0 = 4\pi \times 10^{-7}$ N/A$^2$ is the vacuum magnetic permeability, μr is the relative magnetic permeability, and $R_{ij}$ is the microelement distance between the i-th turn $l_{p1}$ (i), $l_{p2}$ (i) of the transmitting rail and the j-th turn $l_s$ (j) of the pickup coil. The mutual inductances between transmitting rail 1/transmitting rail 2 and the pickup coil can be expressed as:

$$M_1 = \left| \sum_{i=1}^{N_1} \sum_{j=1}^{N_2} M_1(ij) \right| = \frac{\mu_r \mu_0}{4\pi} \sum_{i=1}^{N_1} \sum_{j=1}^{N_2} \left| \int_{l_{p1}(i)} \int_{l_s(j)} \frac{dl_{p1}(i) dl_{s(j)}}{R_{ij}} \right| \quad (9)$$

$$M_2 = \left| \sum_{i=1}^{N_1} \sum_{j=1}^{N_2} M_2(ij) \right| = \frac{\mu_r \mu_0}{4\pi} \sum_{i=1}^{N_1} \sum_{j=1}^{N_2} \left| \int_{l_{p2}(i)} \int_{l_s(j)} \frac{dl_{p2}(i) dl_{s(j)}}{R_{ij}} \right| \quad (10)$$

Therefore, the total mutual inductance M of the magnetic coupling mechanism of the dual-transmission EV-DWPT system can be expressed as:

$$M = M_1 + M_2 \quad (11)$$

Taking the length of the transmitting rail of 0.6 m, the width of 0.25 m, and the number of turns of 8, the length of the energy pickup coil of 0.3 m, the width of 0.3 m, the number of turns of 15, and the coupling distance of 0.1 m as an example, the system mutual inductance characteristics of the planar rectangular magnetic coupling mechanism are studied, mainly considering the changing rules of mutual inductance between the energy pickup coil and the primary side transmitting rail during the driving of the electric vehicle. Define the driving direction of the electric vehicle as the x-direction and the lateral offset direction as the y-direction, the two energy-emitting rails are fed with high-frequency alternating current of the same frequency, phase and equal amplitude at the same moment, let the energy pickup coil move in the x-direction from a position (x=−0.325) corresponding to the center of one transmitting rail to a position (x=−0.325) corresponding to the center of next transmitting, the mutual inductances $M_1$ and $M_2$ between the transmitting rails 1/2 and the energy pickup coil at different positions can be obtained through calculation, and the sum of the mutual inductances M between the two transmitting rails and the energy pickup coil can be obtained, the fitting curves of the mutual inductances $M_1$, $M_2$ and M as the energy pickup coil moves along the x direction are drawn, as shown in FIG. 5 (a) (where the line having the highest starting point is $M_1$).

Figure 5:
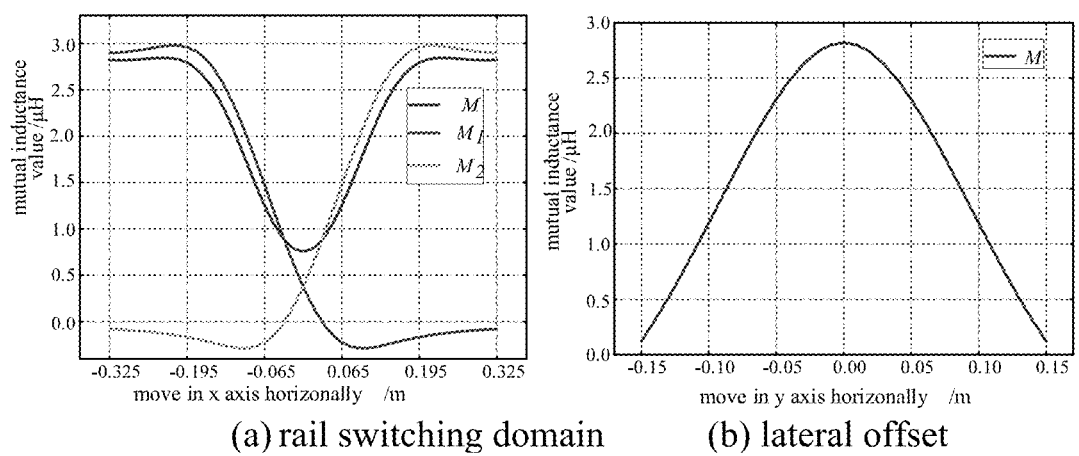
FIG. 5 is a mutual inductance fluctuation trend diagram of the system according to an embodiment of the present disclosure.

It can be seen from FIG. 5(a) that when the coupling distance is fixed, during the energy pickup coil moves from the center of the transmitting rail 1 to the center of the transmitting rail 2, the mutual inductance $M_1$ gradually decreases and the mutual inductance $M_2$ gradually increases, and the mutual inductance M shows a trend of first decreasing and then increasing. It is the largest when it is located above the center of the transmitting rail, and is the smallest in the transmitting rail switching domain. It is symmetrically distributed with the rail switching domain as the axis. The results show that the mutual inductance of the system in the rail switching domain drops significantly. In addition, during the actual driving process of electric vehicles, lateral offset is inevitable due to environmental and human factors, the fitting curve of the mutual inductance M when the pickup coil deviates laterally above the center of the transmitting rails is drawn through calculation, as shown in FIG. 5 (b). It can be seen from FIG. 5(b) that as the pickup coil shifts left and right, the mutual inductance M gradually decreases, and the mutual inductance M of the magnetic coupling mechanism is the largest at the position corresponding to the center of the transmitting rail.

Figure 6:
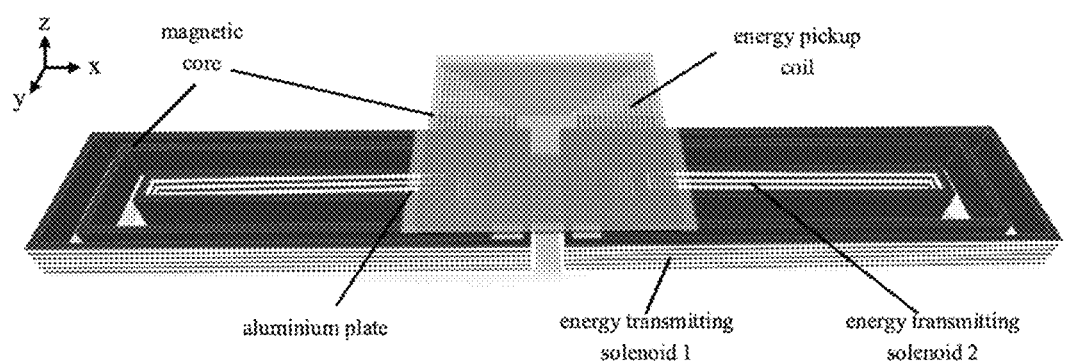
FIG. 6 is a schematic diagram of a double solenoid magnetic coupling mechanism according to an embodiment of the present disclosure.

It can be seen that the mutual inductance of the planar rectangular magnetic coupling mechanism will fluctuate significantly when the relative position between the energy pickup coil and the transmitting rail changes. In particular, the mutual inductance will drop significantly when it is in the rail switching domain and a large range of lateral offset occurs. It should be noted that, in order to enhance the mutual inductance, a ferrite core is usually added to the magnetic coupling mechanism. After adding the ferrite core (magnetic core), the change pattern of mutual inductance of the system is consistent with the above analysis. In the rail switching domain or when a large offset occurs, there will be severe mutual inductance drops. In summary, the mutual inductance fluctuations of the EV-DWPT system during dynamic operation lead to fluctuations in the system output power. The size/value of the mutual inductance depends on the geometry, size, number of turns, coupling distance of the electromagnetic coupling mechanism and the magnetic field distribution around the pickup coil under the action of the magnetic core. In order to maintain the stability of the mutual inductance during the dynamic operation of the system and improve the stability of the output power during the dynamic operation of the EV-DWPT system, the present disclosure proposes a magnetic coupling mechanism with a double solenoid structure, the schematic diagram of which is shown in FIG. 6. The magnetic coupling mechanism includes a transmitting structure and a receiving structure. The transmitting structure comprises a plurality of double solenoid transmitting rails arranged equidistantly along a road direction, each of the double solenoid transmitting rails comprises a square tubular magnetic core perpendicular to a road surface, and an inner energy transmitting solenoid (energy transmitting solenoid 2) and an outer energy transmitting solenoid (energy transmitting solenoid 1) wound spirally on an inner wall and an outer wall of the square tubular magnetic core respectively, the inner energy transmitting solenoid and the outer energy transmitting solenoid use one and the same Litz wire, but are wound in opposite directions. The receiving structure comprises a hierarchically arranged (energy) pickup coil, a receiving-end magnetic core and a metal shielding plate (aluminum plate), and the pickup coil is of a square annular structure.

For the magnetic field coupling wireless power transmission system, the higher the operating frequency within a certain range, the higher the power transmission level and efficiency of the magnetic coupling mechanism. However, the system losses caused by the skin effect and proximity effect caused by the high frequency alternating magnetic field is larger if the operating frequency is higher, the more heated wire in severe case will cause the insulation layer to melt, causing sparks, short circuits, fires and other dangers. The degree of the skin effect is expressed by skin depth δ, that is:

$$\delta = \sqrt{\frac{\rho}{\pi f \mu_0 \mu_r}} \quad (12)$$

where, ρ represents the resistivity of the conductor, which is $1.72 \times 10^{-8}$ Ω·m at room temperature; f represents the frequency of the current flowing through the coil, in Hz; $\mu_o$ is the vacuum magnetic permeability, whose value is $4\pi \times 10^{-7}$ H/m; $\mu_r$ is the relative magnetic permeability, the relative magnetic permeability of copper wire is 1. The wireless power transmission system usually work at high frequencies, in order to reduce the negative impact of the skin effect on the system, the magnetic coupling mechanism must use Litz wire as the coil material. The EV-DWPT system designed in the present disclosure uses an operating frequency of 85 kHz. Based on the common Litz wire specifications on the market, it was decided to use Litz wire with a single wire diameter of 0.1 mm as the coil material. In addition, the rated current value of the Litz wire is also an important parameter for selection. Taking into account the ability of current resistance (current withstanding) of the Litz wire, both the transmitter coil and the pickup coil are wound and formed from Litz wire with a size of 0.1 mm*1000 strands and an outer diameter of 5 mm.

In order to improve the coupling coefficient of the system and reduce the magnetic leakage of the coupling mechanism, it is usually necessary to add a magnetic core to the magnetic coupling mechanism. Taking into account parameters such as core loss, magnetic permeability and saturation magnetic flux density, manganese-zinc ferrite made of PC95 is selected as the core material in this design.

In the EV-DWPT system, the magnetic coupling mechanism often adopts a planar rectangular structure. This structure has the advantages of high coupling coefficient and long transmission distance, but the transmission power of the pickup coil will drop significantly when in the rail switching domain and lateral offset occurs.

Figure 7:
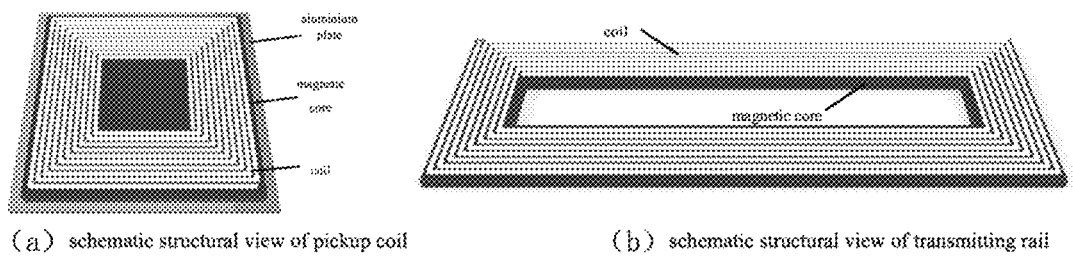
FIG. 7 is a structural diagram of a planar rectangular magnetic coupling mechanism according to an embodiment of the present disclosure.

In order to achieve the stability of the output power of electric vehicles in the rail switching domain and improve the anti-offset ability of the system, the present disclosure will optimize the structure of the magnetic coupling mechanism. Since the energy pickup coil of the EV-DWPT system is usually installed at the bottom of the car, its size and weight are strictly limited, in particular, the thickness of the energy pickup coil should be as thin as possible, so the energy pickup coil also adopts a planar rectangular structure, as shown in FIG. 7 (a), the focus of this study is the transmitting-end rail structure.

The double solenoid transmitting-end rail structure proposed in the present disclosure is shown in FIG. 7(b). This structure is different from the coil structure of the planar rectangular transmitting rail. It is similar to the solenoid winding method, the coil is formed by winding on the magnetic core in a spiraling upward manner. The inner and outer coils are wound and made from one and the same Litz wire, but the inner and outer coils are wound in opposite directions. The double solenoid transmitting rail changes the magnetic field distribution, different from that of the planar rectangular transmitting rail, making the transmission power of the coupling mechanism have good stability when the pickup coil is in the rail switching domain and a large range of lateral offset occurs. Using the COMSOL finite element simulation software, a simulation model with a dual-transmission planar rectangular coupling mechanism and a double solenoid coupling mechanism was built to analyze their mutual inductance fluctuation trends. The simulated coupling mechanism parameters are shown in Table 1.

TABLE 1

Simulation parameter table of two rail structures

| Parameter name | Double solenoid type | planar rectangular |
|---|---|---|
| Outer transmitting coil size | 600 mm*250 mm | 600 mm*250 mm |
| Inner transmitting coil size | 400 mm*50 mm | / |
| Receiving coil size | 300 mm*300 mm | 300 mm*300 mm |
| Number of turns of outer transmitting coil | 8 turns | 8 turns |
| Number of turns of inner transmitting coil | 4 turns | |
| Number of turns of receiving coil | 15 turns | 15 turns |
| Coupling distance | 100 mm | 100 mm |
| Transmitting coil spacing | 20 mm | 20 mm |
| Excitation current | 1A | 1A |
| Wire diameter | 5 mm | 5 mm |

Figure 8:
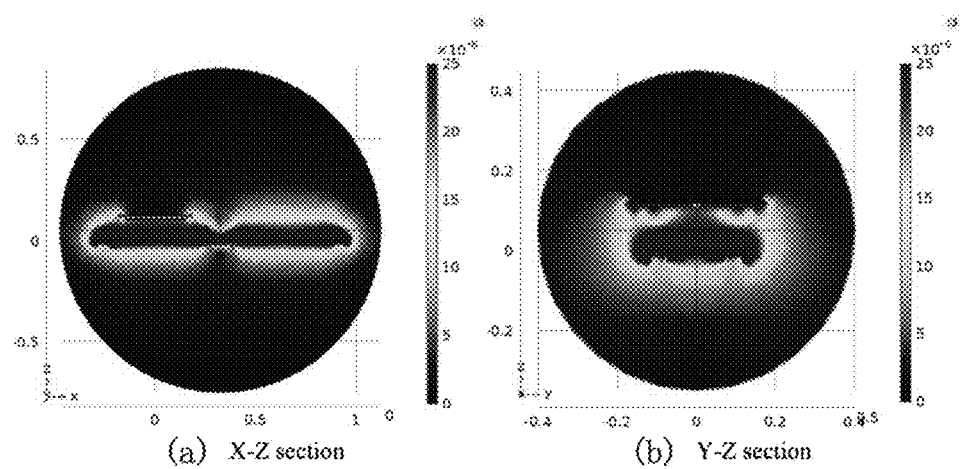
FIG. 8 is a cloud diagram of the magnetic field distribution of the planar rectangular magnetic coupling mechanism according to an embodiment of the present disclosure.
Figure 9:
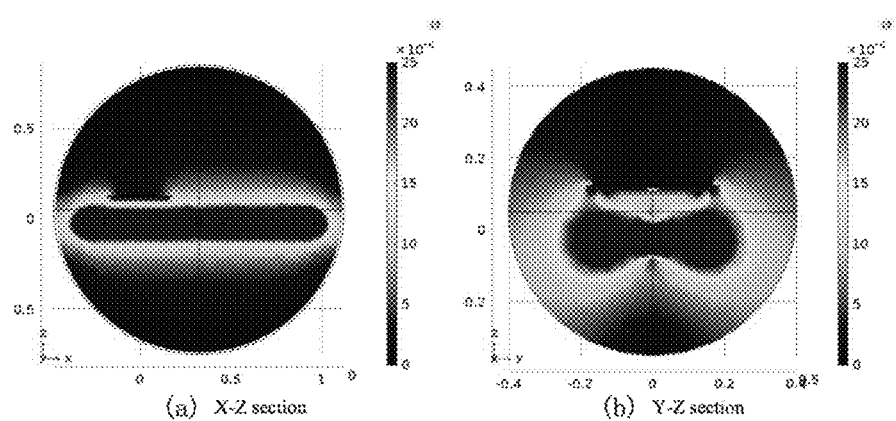
FIG. 9 is a cloud diagram of the magnetic field distribution of the double solenoid magnetic coupling mechanism according to an embodiment of the present disclosure.

FIGS. 8 and 9 are respectively the magnetic field distribution cloud diagrams of the two coupling mechanisms. Through comparison, it is easy to see that in the traveling direction of the electric vehicle, that is, the x-direction, the magnetic field intensity of the planar rectangular coupling mechanism is significantly weakened in the rail switching domain, resulting in the drop of mutual inductance, while the magnetic field intensity of the double solenoid coupling mechanism is evenly distributed in the x-direction, and there is no obvious mutual inductance drop area; in the lateral offset direction, that is, the y-direction, the magnetic field intensity of the planar rectangular coupling mechanism is strong in the center area of the transmitting rail, and the magnetic field intensity on both sides gradually weakens, while the magnetic field intensity of the double solenoid coupling mechanism is weak in the central area of the transmitting rail, and the magnetic field intensity on both sides is strong. When the electric vehicle deviates laterally, the mutual inductance of the double solenoid coupling mechanism drops relatively slowly, and it has better anti-offset performance. The mutual inductance changes of the planar rectangular coupling mechanism and the double solenoid coupling mechanism in the x-direction and y-direction are plotted, as shown in FIG. 10.

Figure 10:
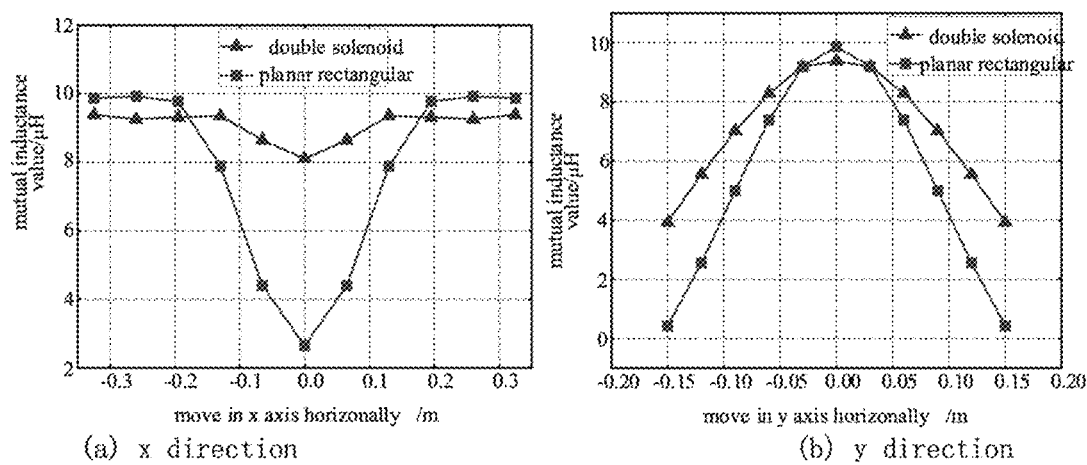
FIG. 10 is a mutual inductance change diagram of two coupling mechanisms according to an embodiment of the present disclosure.

Comparing the mutual inductance changes of the two coupling mechanisms in different directions in FIG. 10, it can be found that the mutual inductance of the planar rectangular coupling mechanism is slightly larger than that of the double solenoid coupling mechanism at the position facing (corresponding to) the transmitting rail, but when in the rail switching domain and lateral offset occurs, the mutual inductance stability of the double solenoid coupling mechanism is significantly better, which verifies that the coupling mechanism proposed in the present disclosure has better performance in resisting power drops. The coupling mechanism will continue to be optimized in terms of the core structure and the number of turns of coil.

Figure 11:
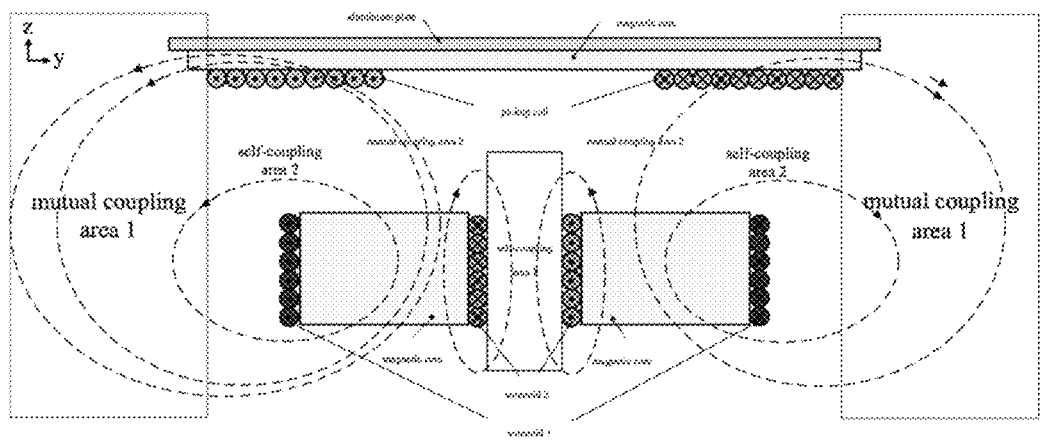
FIG. 11 is a distribution diagram of self-coupling area and mutual coupling area in a y-z section according to an embodiment of the present disclosure.

There is a large air gap between the transmitting rail and the energy pickup coil of the wireless power transmission system, the magnetic coupling mechanism is in a loose (weak) coupling state. Therefore, the magnetic field lines of the system must not only pass through the inside of the magnetic core, but also must pass through the air gap. The magnetic permeability of the magnetic core is much greater than that of the air gap. By establishing an equivalent magnetic circuit model of the magnetic coupling mechanism to qualitatively analyze the magnetic field distribution around the magnetic coupling mechanism, the magnetic resistance of the magnetic flux path can be effectively reduced and the design of magnetic core can be optimized. When the pickup coil is located in the central area of the transmitting rail, the cross-sectional view of the coupling mechanism in the y-z plane is established, as shown in FIG. 11.

Figure 12:
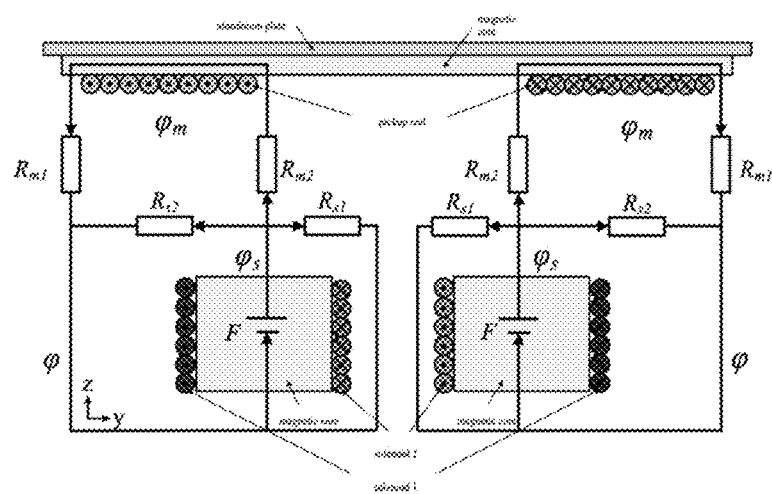
FIG. 12 is an equivalent magnetic circuit model diagram in a y-z section according to an embodiment of the present disclosure.

Ignoring the magnetic resistance of the ferrite core, the magnetic field lines can be divided into two parts depending on whether the transmitting coil is coupled to the pickup coil: self-coupling and mutual coupling. Since the double solenoid magnetic coupling mechanism is symmetrically distributed with a center plane along the x and y directions, its magnetic field is also symmetrically distributed along the central axis. Therefore, the magnetic field characteristics of the system can be analyzed approximately by the cross-sectional magnetic field distribution. The two-dimensional cross-sectional magnetic field distribution of the double solenoid magnetic coupling mechanism and self-coupling and mutual coupling areas are shown in FIG. 11. Assume that the magnetic resistances of the self-coupling area 1 and self-coupling area 2 are $R_{s1}$ and $R_{s2}$ respectively, the magnetic resistances of the mutual coupling area 1 and mutual coupling area 2 are $R_{m1}$ and $R_{m2}$ respectively, and the system magnetomotive force is F, then establish an equivalent magnetic circuit model, as shown in FIG. 12.

Analyze the equivalent magnetic circuit model of the y-z section, use φ to represent the total magnetic flux on one side of the section, $\varphi_s$ and $\varphi_m$ to represent the self-coupling and mutual coupling magnetic fluxes on one side of the section respectively, then the relationship between various magnetic fluxes is:

$$\varphi = \varphi_m + \varphi_s \quad (13)$$

The magnetic circuit expression of coupling coefficient K can be expressed as:

$$K = \frac{\varphi_m}{\varphi} = \frac{R_{s1}//[R_{s2}//(R_{m1}+R_{m2})]}{R_{m1}+R_{m2}} \quad (14)$$

To simplify, we get:

$$K = \frac{1}{1+(R_{m1}+R_{m2})\left(\frac{1}{R_{s1}}+\frac{1}{R_{s2}}\right)} \quad (15)$$

Figure 13:
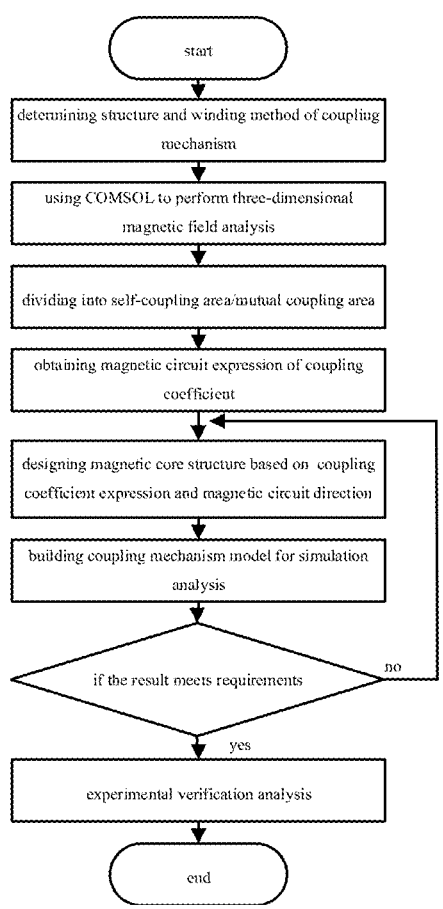
FIG. 13 is a design optimization flow chart of the magnetic core structure according to an embodiment of the present disclosure.

It can be seen from formula (15) that the smaller the magnetic resistances $R_{m1}$, $R_{m2}$ of the mutual coupling area are, the larger the magnetic resistances $R_{s1}$, $R_{s2}$ of the self-coupling area are, and the larger the coupling coefficient K of the system is. Therefore, we can change the shape, structure and position arrangement of the magnetic core to reduce the magnetic resistance in the mutual coupling area and increase the magnetic resistance in the self-coupling area, thereby improving the coupling coefficient of the system. The design process of the magnetic core structure is shown in FIG. 13.

Figure 14:
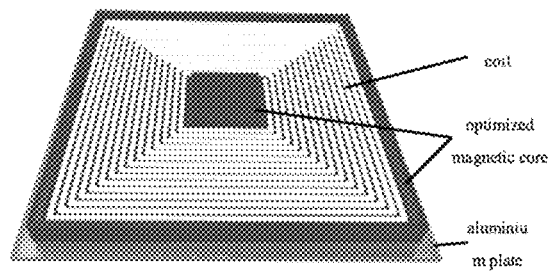
FIG. 14 is a structural diagram of the magnetic coupling mechanism after the magnetic core is optimized according to an embodiment of the present disclosure.
Figure 14:
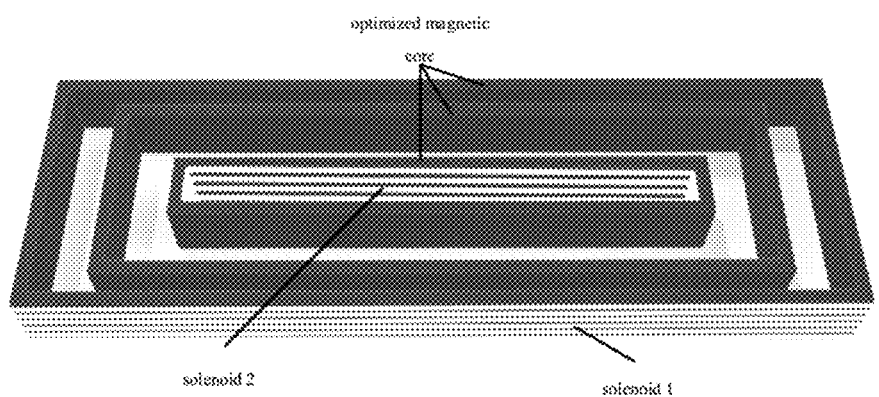

According to the design optimization process of the magnetic core, the magnetic core on the mutual coupling magnetic path is increased, and the optimized magnetic core structure of the energy pickup mechanism is obtained, as shown in FIG. 14 (a). The designed convex part of the magnetic core is based on the magnetic field lines in FIG. 11. By increasing the magnetic core on the mutual coupling magnetic path, the magnetic resistance of the mutual coupling area is reduced, and the coupling coefficient is improved to a certain extent. In addition, the greater the number of magnetic cores in the magnetic coupling mechanism within a certain range, the stronger the coupling capability of the system. However, the weight and cost of the system are directly proportional to the number of magnetic cores. On the premise of ensuring the power transmission capability of the system, the amount of magnetic cores should be reduced as much as possible, so the amount of magnetic cores used in the transmitting rail is reduced, as shown in FIG. 14(b).

It can be seen that the square tubular magnetic core includes an inner square tubular magnetic core, a middle square tubular magnetic core and an outer square tubular magnetic core that are partitioned. The inner energy transmitting solenoid is wound on the inner wall of the inner square tubular magnetic core, and the outer energy-transmitting solenoid is wound around the outer wall of the outer square tubular magnetic core.

A square protrusion is provided at the center of the receiving-end magnetic core, and the square protrusion fits into the square gap in the center of the pickup coil.

In order to verify the above conclusion, next, the COMSOL simulation analysis is used to compare the size and change of the coupling coefficient of the system at different positions before and after optimization. The coupling coefficients before and after the core optimization are shown in FIG. 15, and the simulation parameters are the same as Table 1.

Figure 15:
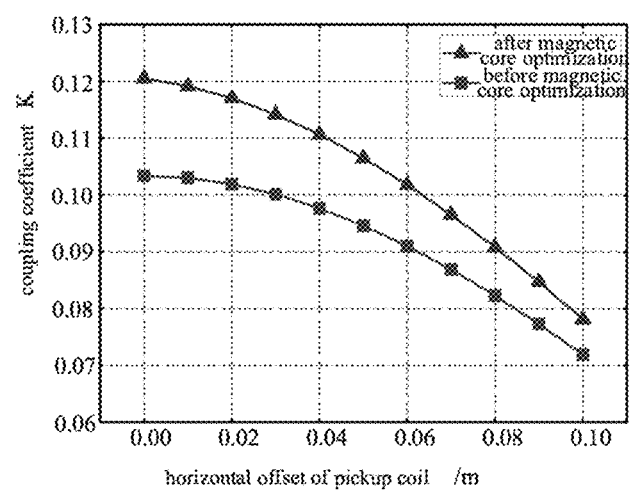
FIG. 15 is a comparison diagram of coupling coefficients of two magnetic core structures according to an embodiment of the present disclosure.

It can be seen from FIG. 15 that the coupling coefficient is significantly improved after the magnetic core is optimized, and the coupling coefficient at different offset distances is greater than that of the magnetic core structure before optimization. The present disclosure analyzes the magnetic field distribution of the double solenoid coupling mechanism, and derives the magnetic circuit expression of the coupling coefficient by establishing an equivalent magnetic circuit model, and based on this, the magnetic core structure is optimized and designed, effectively improving the coupling coefficient of the system, and thereby improving the charging efficiency of the system.

Figure 16:
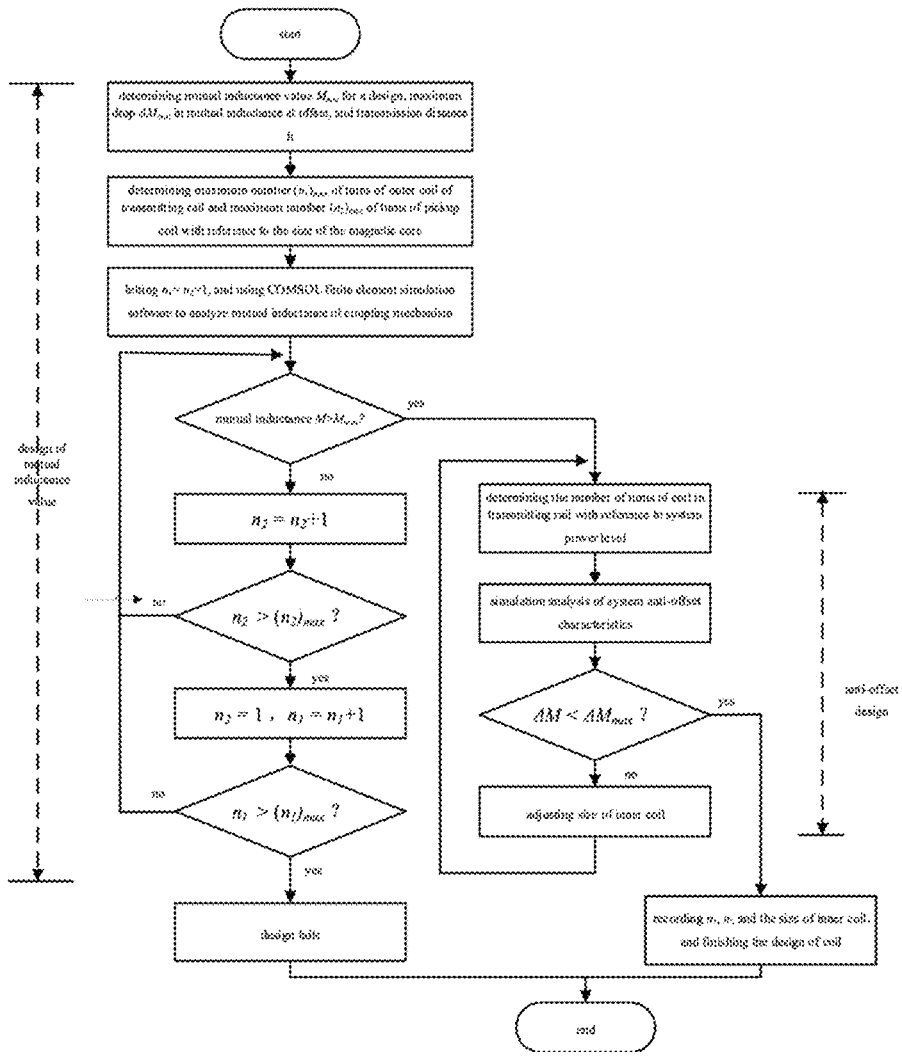
FIG. 16 is a flow chart of coil optimization design according to an embodiment of the present disclosure.

In actual engineering applications, the size of the electromagnetic coupling mechanism will be strictly limited by the actual application scenario. Therefore, after determining the core structure and the winding shape of the coil, it is necessary to focus on the number of turns of coil. For the proposed double solenoid coupling mechanism, the present disclosure proposes a coil optimization design method. First, based on the given target mutual inductance size/value, the number of turns of coil is optimally designed based on the size of the magnetic core to obtain sufficient large mutual inductance M; secondly, the size of the coil in the transmitting rail is designed to further improve the stability of the mutual inductance M under the condition of rail switching domain and offset. The specific optimization design process is shown in FIG. 16, it includes steps:

A1: setting a target mutual inductance value $M_{min}$ and a transmission distance h;

A2: with reference to dimensions of the outer square tubular magnetic core and the receiving-end magnetic core, determining a maximum value $(n_1)_{max}$ of $n_1$ and a maximum value $(n_2)_{max}$ of $n_2$;

A3: letting $n_1=n_2=1$, and using COMSOL finite element simulation software to calculate a mutual inductance M of the magnetic coupling mechanism;

A4: determine whether M is greater than $M_{min}$, if so, record the current value of $n_1$ and $n_2$; if not, go to the next step;

A5: adding 1 to $n_2$, that is, $n_2=n_2+1$;

A6: determining whether the current $n_2$ is greater than $(n_2)_{max}$, if not, return to the step A4; if so, proceed to the next step;

A7: letting $n_2=1$, adding 1 to $n_1$, that is, $n_1=n_1+1$;

A8: determining whether the current $n_1$ is greater than $(n_1)_{max}$, if not, return to the step A4; if so, the design fails.

After determining $n_1$ and $n_2$, determine the coil size of the inner energy transmitting solenoid through the following steps:

B1: determining an initial value of the coil size with reference to a system power level, the number of turns of coils in the transmitting rails and a maximum drop $\Delta M_{max}$ of mutual inductance at offset;

B2: simulating anti-offset characteristics of the system;

B3: analyzing and determining whether the drop $\Delta M$ of mutual inductance at offset is less than $\Delta M_{max}$, if so, record the current coil size; if not, adjust the coil size and return to the step B2.

Figure 17:
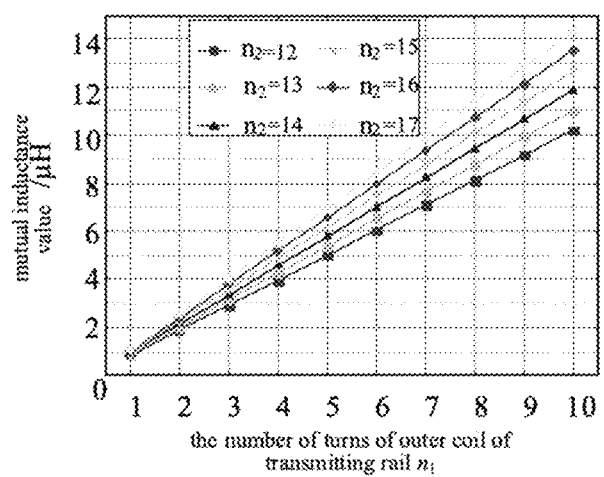
FIG. 17 is a diagram showing the relationship between the mutual inductance and the number of turns of coil according to an embodiment of the present disclosure.

According to the Neumann mutual inductance calculation formula, it can be seen that the mutual inductance of the coil is proportional to the number of turns. After simulation analysis, it was found that the mutual inductance of the double solenoid magnetic coupling mechanism mainly depends on the number of turns of the outer coil of the transmitting rail and the number of turns of the pickup coil, while the number of turns of the inner coil has little effect on the mutual inductance. The main function of the inner coil of the transmitting rail is to change the direction and distribution of magnetic force lines, so the inner coil has an important impact on the anti-offset performance of the system. Therefore, when designing the number of turns of coil, the number of turns of the outer coil of the transmitting rail and the number of turns of the pickup coil should be taken into special consideration. If the number of turns of the inner coil of the transmitting rail is 0 and the number of turns of the pickup coil is different, the mutual inductance M of the system changes with the number of turns of the outer coil of the transmitting rail, this situation is shown in FIG. 17. Analysis of FIG. 17 shows that when the number of turns of the pickup coil is constant, the mutual inductance of the coupling mechanism is proportional to the number of turns of the outer coil of the transmitting rail; the more the number of turns of the pickup coil, the greater the mutual inductance of the coupling mechanism. However, as the number of turns increases, the weight and cost of the magnetic coupling mechanism will also increase, and the system loss will increase accordingly. Therefore, the amount of wire used should be reduced as much as possible while ensuring the size of the mutual inductance. According to the design process shown in FIG. 6, with 10 μH as the target mutual inductance value, the optimal numbers of turns for the outer coil of the transmitting rail and the pickup coil are 8 turns and 15 turns respectively.

Figure 18:
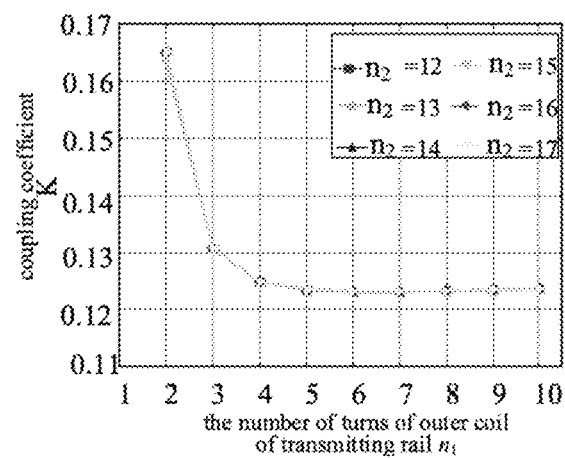
FIG. 18 is a diagram showing the relationship between the coupling coefficient and the number of turns of coil according to an embodiment of the present disclosure.

FIG. 18 plots the change of the coupling coefficient K with the number of turns of the outer coil of the transmitting rail and the number of turns of the pickup coil. As the number of turns of the outer coil of the transmitting rail increases, the coupling coefficient of the system first decreases and then becomes stable. When the number of turns of the outer coil of the transmitting rail becomes more than 5 turns, the coupling coefficient remains basically unchanged. Although the coupling coefficient of the system is larger when the number of turns of the outer coil of the transmitting rail is smaller, the mutual inductance M in this case is too small to meet the power transmission requirements of the system. Comparing the coupling coefficients when the number of turns of the pickup coil is different, it can be found that the number of turns of the pickup coil has almost no impact on the coupling coefficient of the system.

In order to improve the anti-offset performance of the system, the size of the inner coil of the transmitting rail is simulated and designed on the basis that the outer coil of the transmitting rail is 8 turns and the pickup coil is 15 turns. The optimal size of the inner coil is not unique, but when the length of the inner coil is determined, its width has an optimal design value. With reference to the size of the magnetic core, the present disclosure simulates and optimizes the width L of the inner coil under the premise that the length of the inner coil is 400 mm, and draws the variation curves of the mutual inductances $M_{p1s}$, $M_{p2s}$ between the transmitting rail 1 and the transmitting rail 2 and the pickup coil and the total equivalent mutual inductance M, as shown in FIG. 19.

Figure 19:
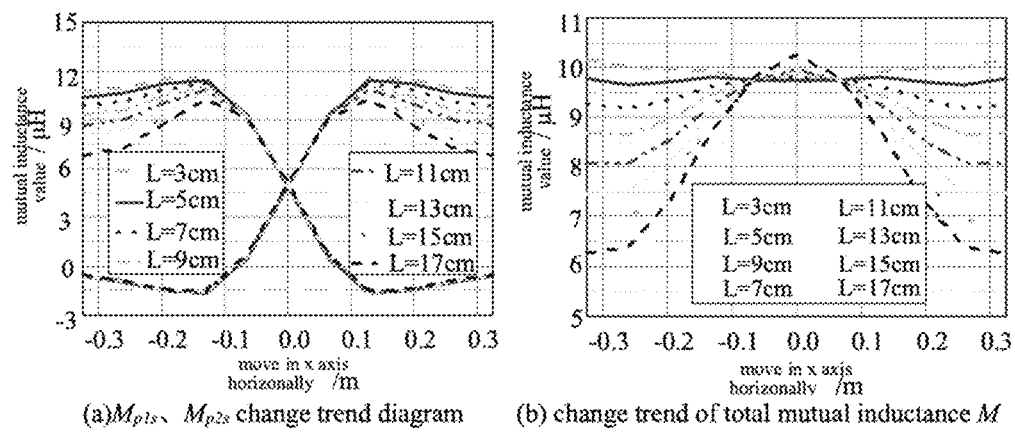
FIG. 19 is a mutual inductance change trend diagram under different widths L according to an embodiment of the present disclosure.

FIG. 19 (a) shows the changing trend of the mutual inductances $M_{p1s}$, $M_{p2s}$ as the pickup coil moves along the x direction under different widths L. The influence of the width of the inner coil of the transmitting rail on the mutual inductance mainly presents in the center of the rail. The larger the width L of the inner coil, the smaller the mutual inductance M of the system. After crossing the center position of the rail switching domain, the mutual inductance between the pickup coil and the previous transmitting rail is almost no longer affected by the width of the inner coil. FIG. 19 (b) shows the relationship between the fluctuation characteristics of the total equivalent mutual inductance M and the change of the width L of the inner coil. When L=50 mm, the fluctuation of M is the smallest, so the size of the inner coil of the transmitting rail is designed to be 400 mm*50 mm. In summary, the specific parameters of the double solenoid coupling mechanism designed in the present disclosure are shown in Table 2.

TABLE 2

Design parameter table of double solenoid coupling mechanism

| Parameter name | Double solenoid type |
|---|---|
| Outer transmitting coil size | 600 mm*250 mm |
| Inner transmitting coil size | 400 mm*50 mm |
| Receiving coil size | 300 mm*300 mm |
| Number of turns of outer transmitting coil | 8 turns |

TABLE 2-continued

Design parameter table of double solenoid coupling mechanism

| Parameter name | Double solenoid type |
|---|---|
| Number of turns of inner transmitting coil | 4 turns |
| Number of turns of receiving coil | 15 turns |
| Coil diameter | 5 mm |

Figure 20:
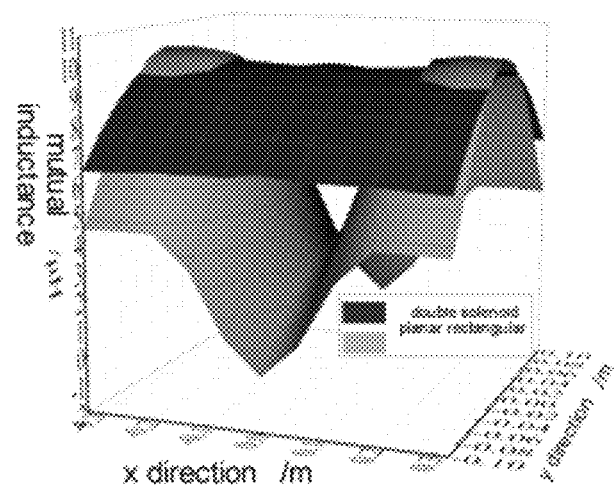
FIG. 20 shows three-dimensional mutual inductance curves of two magnetic coupling mechanisms according to an embodiment of the present disclosure.

The three-dimensional mutual inductance curves of the planar rectangular magnetic coupling mechanism and the double solenoid magnetic coupling mechanism under different offset conditions are drawn, as shown in FIG. 20.

As can be seen from FIG. 20, the double solenoid magnetic coupling mechanism designed in the present disclosure greatly improves the mutual inductance drop problem of the planar rectangular magnetic coupling mechanism in the rail switching domain, and also improves the anti-offset capability of the system to a certain extent.

Figure 21:
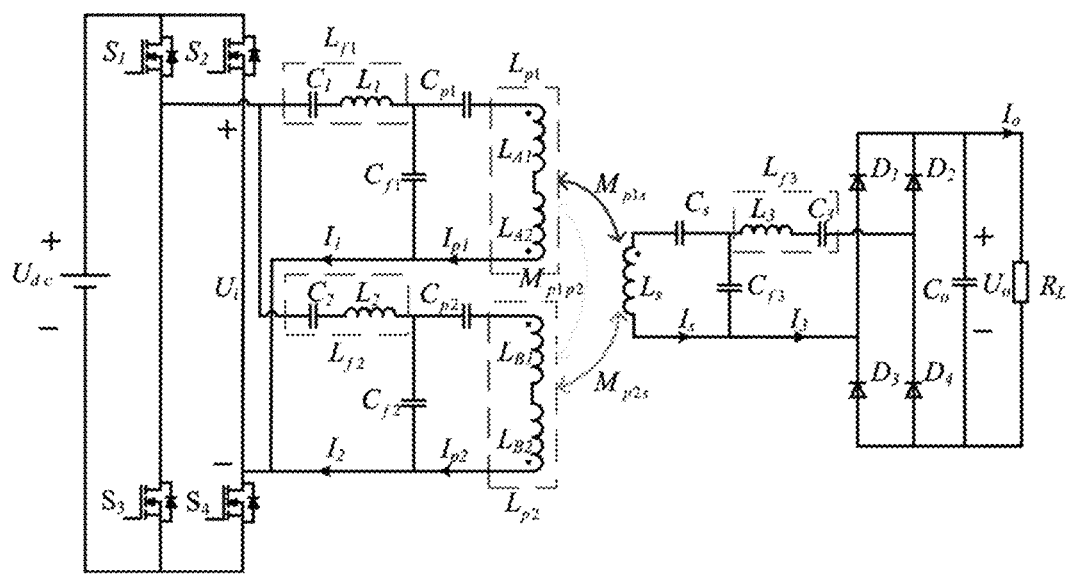
FIG. 21 is a circuit topology diagram of the EV-DWPT system according to an embodiment of the present disclosure.
Figure 22:
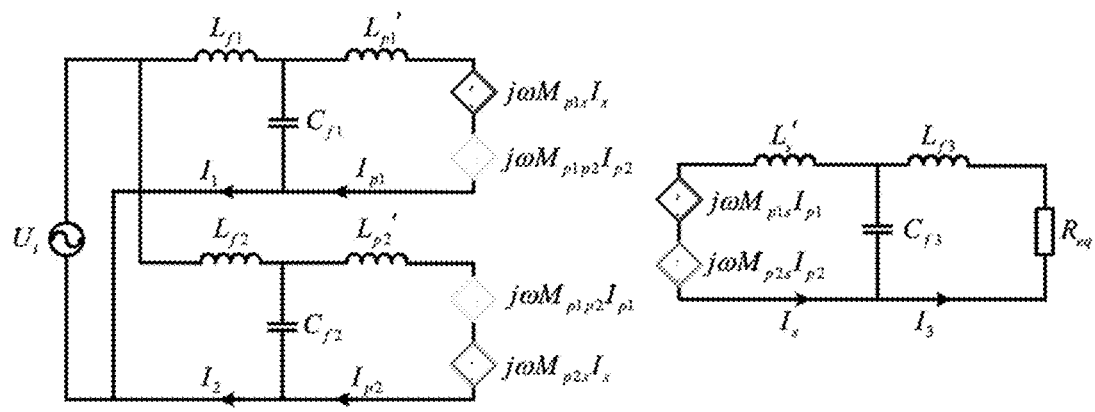
FIG. 22 is a simplified equivalent circuit topology diagram of FIG. 21 according to an embodiment of the present disclosure.

The present disclosure adopts a working mode in which a single inverter drives two sets of LCC-LCC resonance compensation networks and rails. The system topology and coupling relationship are shown in FIG. 21. In FIG. 21, $U_{dc}$ is the DC input voltage of the system, $S_1$-$S_4$ constitute a full-bridge inverter circuit, $U_i$ represents the inverter output voltage, and $I_1$, $I_2$ represent the inverter output current. In order to enhance the filtering characteristics of the system and reduce the impact of high-order harmonics on the system operation, $L_1$ and $C_1$ are connected in series to equivalently replace the primary side resonance compensation inductor $L_{f1}$, $L_2$ and $C_2$ are connected in series to equivalently replace the primary side resonance compensation inductor $L_{f2}$, and $L_3$ and $C_3$ are connected in series to equivalently replace the secondary side resonant compensation inductor $L_{f3}$, and $C_{f1}$, $C_{f2}$, $C_{p1}$ and $C_{p2}$ are the primary side compensation capacitors. $L_{p1}$, $L_{p2}$ represent the transmitting rail 1 and the transmitting rail 2 respectively, $L_s$ represents the energy pickup coil, $I_{p1}$, $I_{p2}$ and $I_s$ are the currents of the transmitting rail 1, the transmitting rail 2 and the energy pickup coil respectively, $C_{f3}$, $C_s$ are the secondary side compensation capacitors, $I_3$ is the system output current, $D_1$-$D_4$ constitute a full-bridge rectifier circuit, $C_o$ is the filter capacitor, $U_o$ represents the load voltage, $I_o$ represents the load current, $R_L$ is the load equivalent resistance, and the system operating angular frequency is $\omega$. It should be noted that the transmitting rail 1 and the transmitting rail 2 are composed of inner and outer coils connected in reverse series and wound using the same Litz wire. Therefore, the cross mutual inductances $M_{A1A2}$, $M_{B1B2}$ between the inner and outer coils of the transmitting rails are not considered when modeling. The inner and outer coils $L_{A1}$, $L_{A2}$ and $L_{B1}$, $L_{B2}$ can be equivalent to $L_{p1}$ and $L_{p2}$ respectively. Then the mutual inductances of the transmitting rail 1, the transmitting rail 2 and the pickup coil are $M_{p1s}$ and $M_{p2s}$ respectively. The cross mutual inductance between the transmitting rails is $M_{p1p2}$, and the decoupling equivalent circuit of the system in FIG. 21 is obtained, as shown in FIG. 22.

Herein, $L_{p1}'$, $L_{p2}'$, $L_s'$, $R_{eq}$ can be expressed as:

$$L_{p1}' = L_{p1} - 1/(\omega^2 C_{p1}) \quad (16)$$

$$L_{p2}' = L_{p2} - 1/(\omega^2 C_{p2})$$

$$L_s' = L_s - 1/(\omega^2 C_s)$$

$$U_i = \frac{2\sqrt{2}\, U_{dc}}{\pi}$$

$$R_{eq} = 8R_L/\pi^2$$

According to Kirchhoff's voltage law, the voltage equations of the six loops of the system are listed as follows:

$$\begin{cases} \dot{U}_i = j\omega L_{f1} \dot{I}_1 + \dfrac{1}{j\omega C_{f1}}(\dot{I}_1 - \dot{I}_{p1}) \\ 0 = -\dfrac{1}{j\omega C_{f1}}(\dot{I}_1 - \dot{I}_{p1}) + j\omega L_{p1}' \dot{I}_{p1} + j\omega M_{p1p2} \dot{I}_{p2} - j\omega M_{p1s} \dot{I}_s \\ \dot{U}_i = j\omega L_{f2} \dot{I}_2 + \dfrac{1}{j\omega C_{f2}}(\dot{I}_2 - \dot{I}_{p2}) \\ 0 = -\dfrac{1}{j\omega C_{f2}}(\dot{I}_2 - \dot{I}_{p2}) + j\omega L_{p2}' \dot{I}_{p2} + j\omega M_{p1p2} \dot{I}_{p1} - j\omega M_{p2s} \dot{I}_s \\ 0 = -j\omega M_{p1s} \dot{I}_{p1} - j\omega M_{p2s} \dot{I}_{p2} + \dfrac{1}{j\omega C_{f3}}(\dot{I}_s - \dot{I}_3) + j\omega L_s' \dot{I}_s \\ 0 = -\dfrac{1}{j\omega C_{f3}}(\dot{I}_s - \dot{I}_3) + j\omega L_{f3} \dot{I}_3 + R_{eq} \dot{I}_3 \end{cases} \quad (17)$$

Simplified, that is:

$$\begin{cases} \dot{U}_i = \left(j\omega L_{f1} + \dfrac{1}{j\omega C_{f1}}\right)\dot{I}_1 - \dfrac{1}{j\omega C_{f1}}\dot{I}_{p1} \\ 0 = -\dfrac{1}{j\omega C_{f1}}\dot{I}_1 + \left(j\omega L_{p1}' + \dfrac{1}{j\omega C_{f1}}\right)\dot{I}_{p1} + j\omega M_{p1p2} \dot{I}_{p2} - j\omega M_{p1s} \dot{I}_s \\ \dot{U}_i = \left(j\omega L_{f2} + \dfrac{1}{j\omega C_{f2}}\right)\dot{I}_2 - \dfrac{1}{j\omega C_{f2}}\dot{I}_{p2} \\ 0 = j\omega M_{p1p2} \dot{I}_{p1} - \dfrac{1}{j\omega C_{f2}}\dot{I}_2 + \left(j\omega L_{p2}' + \dfrac{1}{j\omega C_{f2}}\right)\dot{I}_{p2} - j\omega M_{p2s} \dot{I}_s \\ 0 = -j\omega M_{p1s} \dot{I}_{p1} - j\omega M_{p2s} \dot{I}_{p2} + \left(j\omega L_s' + \dfrac{1}{j\omega C_{f3}}\right)\dot{I}_s - \dfrac{1}{j\omega C_{f3}}\dot{I}_3 \\ 0 = -\dfrac{1}{j\omega C_{f3}}\dot{I}_s + \left(j\omega L_{f3} + \dfrac{1}{j\omega C_{f3}} + R_{eq}\right)\dot{I}_3 \end{cases} \quad (18)$$

Figure 23:
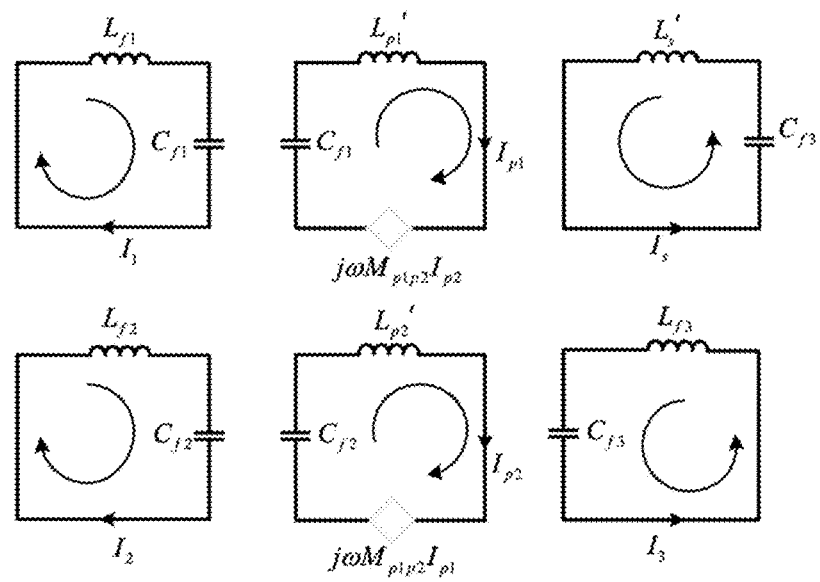
FIG. 23 is a resonant circuit diagram of the dual-transmission EV-DWPT system according to an embodiment of the present disclosure.

In order to reduce the equivalent impedance of the system, reduce the reactive power of the system, and improve the power transmission level and efficiency of the system, the EV-DWPT system must work in a resonant state. The following six resonant circuits can be obtained from the established system equivalent circuit topology, as shown in FIG. 23.

The above modeling analysis considers the coupling between the transmitting rails, so the mutual inductance $M_{p1p2}$ between the transmitting rail 1 and transmitting rail 2 is added to the resonant circuit of the system. The transmitting rail 1 and transmitting rail 2 are completely consistent in system structure and parameters, so $L_{f12}=L_{f1}=L_{f2}$, $C_{f12}=C_{f1}=C_{f2}$, $L_{p12}'=L_{p1}'=L_{p2}'$ can be set. When the system is completely resonant, the following conditions should be met:

$$1=\omega^2 L_{f12} C_{f12}=\omega^2(L_{12}'-M_{p1p2})$$
$$C_{f12}=\omega^2 L_s' C_{f3}=\omega^2 L_{f3} C_{f3} \quad (19)$$

Putting formula (19) into formula (18), the solution is:

$$\begin{cases} \dot{I}_1 = \dfrac{[jM_{p1s}(M_{p1s}+M_{p2s})R_{eq}+\omega M_{p1p2}L_{f3}^2]\dot{U}_i}{j\omega^2 L_{f12}^2 L_{f3}^2} \\ \dot{I}_2 = \dfrac{[jM_{p2s}(M_{p1s}+M_{p2s})R_{eq}+\omega M_{p1p2}L_{f3}^2]\dot{U}_i}{j\omega^2 L_{f12}^2 L_{f3}^2} \\ \dot{I}_3 = \dfrac{(M_{p1s}+M_{p2s})\dot{U}_i}{j\omega L_{f12}L_{f3}},\ \dot{I}_{p1} = \dot{I}_{p2} = \dfrac{\dot{U}_i}{j\omega L_{f12}},\ \dot{I}_s = \dfrac{R_{eq}(M_{p1s}+M_{p2s})\dot{U}_i}{\omega^2 L_{f12}L_{f3}^2} \end{cases} \quad (20)$$

When the system parameters are determined, the transmitting coil current and output current only depend on the input voltage. When the EV-DWPT system is running, system parameters such as mutual inductance $M_{p1s}$, $M_{p2s}$ will dynamically change in real time. The primary side transmitting rail and load current have constant current characteristics, it ensures the system always has good stability. However, due to the cross-coupling between the transmitting rails, the resonance state of the system needs to be analyzed. Let the total output current of the inverter be $\dot{I}$, it can be expressed as:

$$\dot{I} = \dot{I}_1 + \dot{I}_2 = \dfrac{[j(M_{p1s}+M_{p2s})^2 R_{eq}+2\omega M_{p1p2}L_{f3}^2]\dot{U}_i}{j\omega^2 L_{f12}^2 L_{f3}^2} \quad (21)$$

If $Z_{in}$ represents the input impedance of the entire system, then $Z_{in}$ can be expressed as:

$$Z_{in} = \dfrac{\dot{U}_i}{\dot{I}} = \dfrac{j\omega^2 L_{f12}^2 L_{f3}^2}{j(M_{p1s}+M_{p2s})^2 R_{eq}+2\omega M_{p1p2}L_{f3}^2} \quad (22)$$

Assuming that the difference between the inverter output voltage and current phase angle is α, then α reflects the resonant state of the system. When the value of α is greater than zero, the system is inductive; when the value of α is less than zero, the system is capacitive. In addition, the absolute value of α represents the degree to which the system deviates from the resonance point. The tangent of α can be expressed as:

$$\tan\alpha = \dfrac{\text{Im}(Z_{in})}{\text{Re}(Z_{in})} = \dfrac{2\omega M_{p1p2}L_{f3}^2}{(M_{p1s}+M_{p2s})^2 R_{eq}} \quad (23)$$

It can be seen from formula (23) that the tangent value of α is greater than zero, that is, the value of α is greater than zero. It shows that under reasonable parameter configuration, the system will not completely operate at the theoretical resonance point, but will show weak inductance, which ensures the normal operation of the system and makes the system have ZVS soft switching operating characteristics.

On the premise of neglecting the internal resistance, assuming that the output power of the system is $P_o$, it can be obtained with reference to formula (20):

$$P_o = |\dot{I}_3|^2 R_{eq} = \dfrac{(M_{p1s}+M_{p2s})^2 R_{eq}}{\omega^2 L_{f12}^2 L_{f3}^2}|\dot{U}_i|^2 \quad (24)$$

In the output power expression, ω, $L_{f12}$, $L_{f3}$ are only related to the system parameter design and do not change during the movement of the electric vehicle. The load equivalent resistance $R_{eq}$ is determined by the vehicle battery, so when the input voltage $U_i$ is constant, the output power of the EV-DWPT system is only related to the mutual inductance of the coupling mechanism. In practical applications, the internal resistance of the transmitting coil and the receiving coil is often large and cannot be ignored, it can be seen from formula (20) that the primary side coil current is not affected by the coil impedance of the coupling mechanism. Let the internal resistance of the pickup coil be $R_s$, then the output power of the system considering loss can be expressed as:

$$P_o = \dfrac{(M_{p1s}+M_{p2s})^2 \omega^2 L_{f3}^2 R_{eq}}{L_{f12}^2 (\omega^2 L_{f3}^2 + R_{eq}R_s)^2}|\dot{U}_i|^2 \quad (25)$$

It can be seen from formula (25) that when the parameters such as ω, $L_{f12}$, $L_{f3}$, $R_{eq}$, $U_i$ are constant, the output power of the system is not only related to the mutual inductance of the coupling mechanism, but also affected by the internal resistance of the pickup coil. The larger the internal resistance of the pickup coil is, the smaller the output power is. Let η represent the system efficiency and $R_p$ represent the internal resistance of the transmitting coil, then:

$$\eta = \dfrac{\omega^4(M_{p1s}+M_{p2s})^2 L_{f3}^2 R_{eq}}{[\omega^2(M_{p1s}+M_{p2s})^2 R_{eq}+\omega^2 L_{f3}^2 R_p + R_p R_s R_{eq}](R_s R_{eq}+\omega^2 L_{f3}^2)} \quad (26)$$

Figure 24:
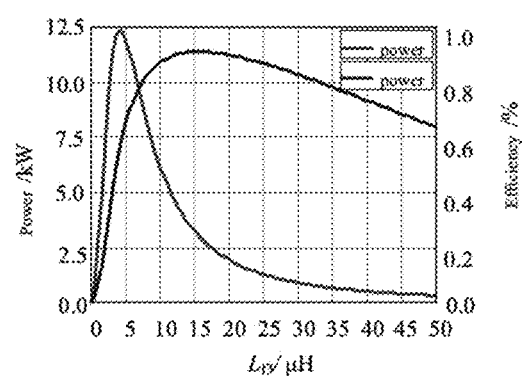
FIG. 24 is a graph showing the relationship between energy efficiency characteristics and $L_{f3}$ according to an embodiment of the present disclosure.

The relationship curve between the energy efficiency characteristic of the system and the compensation inductor $L_{f3}$ is drawn, as shown in FIG. 24.

Analyzing FIG. 24, it can be seen that as $L_{f3}$ increases, the output power level and efficiency both show a trend of first increasing and then decreasing. When the value of $L_{f3}$ is 4 μH, the system output power is maximum, and when the value of $L_{f3}$ is 15 μH, the system efficiency is the highest. Calculated from formula (20), it can be seen that when the value of $L_{f3}$ is selected as 4 μH, the current of the pickup coil 115.3A, which will far exceed the current withstand value of the selected Litz wire, and the system efficiency in this case is very low, so the design of the present disclosure is based on the optimal efficiency. It is verified that when the value of $L_{f3}$ is selected as 15 μH, the current of the pickup coil is 30.1A, which meets the rated current requirements of the Litz wire. When the value of $L_{f3}$ is selected as 15 μH, it can be calculated and obtained by substituting the system measurement parameters that the system transmission power and efficiency in this case are 3.4 kW and 89% respectively.

Since there is cross-coupling between the transmitting rails of the dual-transmission EV-DWPT system, the mutual inductance between the transmitting rail 1 and transmitting rail 2 needs to be considered as $M_{p1p2}$ when designing the resonant capacitance of the system. The introduction of mutual inductance $M_{p1p2}$ changes the sizes of the series compensation capacitors $C_{p1}$, $C_{p2}$, which can be obtained according to formulas (16) and (19):

$$\begin{cases} C_{p1} = \dfrac{1}{\omega^2(L_{p1} - L_{f1} - M_{p1p2})} \\ C_{p2} = \dfrac{1}{\omega^2(L_{p2} - L_{f2} - M_{p1p2})} \end{cases} \quad (27)$$

Under ideal conditions, the mutual inductance $M_{p1p2}$ remains basically unchanged during the dynamic operation of the electric vehicle. The introduction of $M_{p1p2}$ during tuning will not affect the normal operation of the EV-DWPT system. In actual engineering, due to production error in capacitors, they are easily affected by environmental temperature, magnetic field and other factors, the actual measured values of series compensation capacitors $C_{p1}$, $C_{p2}$ in working conditions deviate from the standard values. In severe cases, the system may be detuned and the power transmission level and efficiency may be greatly reduced, so it is of great significance to analyze the sensitivity of the series compensation capacitors $C_{p1}$, $C_{p2}$. The following will analyze the influence of mutual inductance $M_{p1p2}$ on series compensation capacitors $C_{p1}$, $C_{p2}$. The change rate of the capacitance values of $C_{p1}$, $C_{p2}$ in the resonance state is defined as the sensitivity. $S_{12}$ is used to represent the degree to which $C_{p1}$, $C_{p2}$ deviates from the resonance state, $\Delta C_{p12}$ represents the change amount of $C_{p1}$, $C_{p2}$, $C_{p12}$ represents the capacitance value of $C_{p1}$, $C_{p2}$ in the resonance state, then:

$$S_{12} = \frac{1}{C_{p12}} |\Delta C_{p12}| \quad (28)$$

In formula (28), the slope $1/C_{p12}$ represents the sensitivity of the series compensation capacitors $C_{p1}$ and $C_{p2}$. The sensitivity analysis curve of the series compensation capacitors $C_{p1}$ and $C_{p2}$ when the mutual inductance $M_{p1p2}$ is different is plotted, as shown in FIG. 25.

Figure 25:
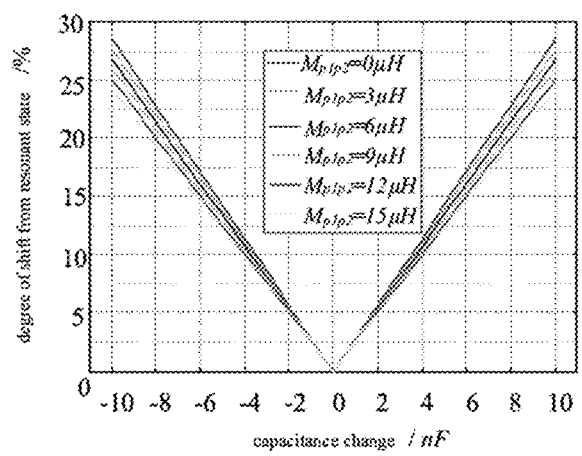
FIG. 25 is a $C_p$ sensitivity analysis curve graph according to an embodiment of the present disclosure.

FIG. 25 shows the degree of $C_{p12}$ offset resonance state standard value corresponding to $M_{p1p2}$ with a gradient of 3 μH from 0 μH to 15 μH. As $M_{p1p2}$ increases, the $C_{p12}$ capacitance change rate gradually decreases, that is, the sensitivity of $C_{p12}$ becomes smaller and smaller. Combined with the analysis of formula (23), it can be seen that the larger $M_{p1p2}$ is, the stronger the sensitivity of the system will be when it is fully resonant. Therefore, $M_{p1p2}$ cannot be too large to cause the system to deviate from the resonance state.

Figure 26:
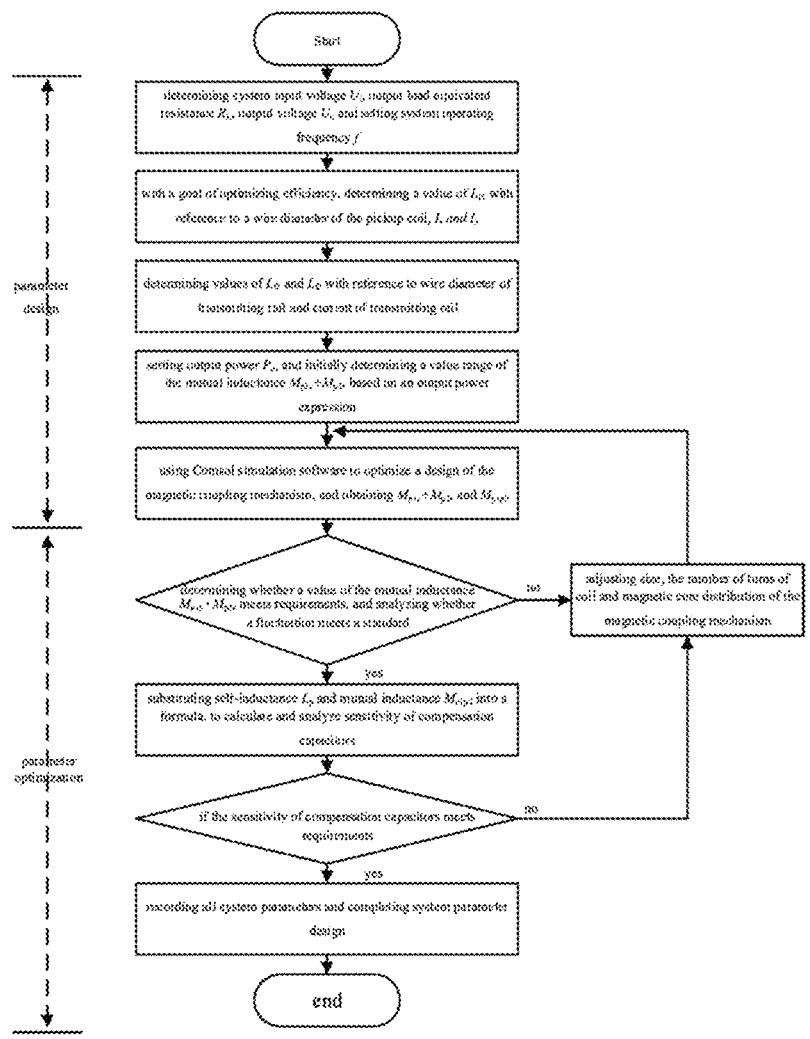
FIG. 26 is a flow chart of the system parameter design according to an embodiment of the present disclosure.

Based on the above analysis, the parameter design process of the dual-transmission parallel EV-DWPT system is shown in FIG. 26.

According to formulas (20) and (25), it can be seen that the smaller the value of the compensation inductor $L_{f12}$, the greater the system output power $P_o$, but the greater the current of each node of the system. In actual engineering applications, considering the limited current withstand value of power devices such as inverters, inductors, capacitors, and coils, the sizes of $L_{f12}$ and $L_{f3}$ must be within a reasonable range. On the premise of ensuring system safety, with the goal of optimizing system efficiency, the system parameter design process is as follows:

Step I: according to system requirements, determining a system input voltage $U_i$, an output load equivalent resistance $R_L$, an output voltage $U_o$ and setting a system operating frequency f;

Step II: with a goal of optimizing efficiency, determining a value of $L_{f3}$ with reference to a wire diameter of the pickup coil, a current expression of the pickup coil $I_s = R_{eq}(M_{p1s} + M_{p2s})U_i/\omega^2 L_{f12} L_{f3}^2$ and an output current expression $I_3 = (M_{p1s} + M_{p2s})U_i/j\omega L_{f12} L_{f3}$;

Step III: determining values of $L_{f1}$ and $L_{f2}$ with reference to a wire diameter of the double solenoid transmitting rails and a current expression of transmitting rails $I_p = U_i/\omega L_{fi}$;

Step IV: setting a system output power $P_o$, and initially determining a value range of the mutual inductance $M_{p1s} + M_{p2s}$ of a rail center area and a rail switching domain of the magnetic coupling mechanism based on an output power expression;

Step V: using Comsol simulation software to optimize the design of the magnetic coupling mechanism, and obtaining the mutual inductance $M_{p1s} + M_{p2s}$ of the pickup coil and the transmitting rails and the cross-mutual inductance $M_{p1p2}$ of two adjacent transmitting rails through simulation;

Step VI: determining through calculation whether a value of the mutual inductance $M_{p1s} + M_{p2s}$ meets the system output power requirements, and qualitatively and quantitatively analyzing whether the fluctuation of $M_{p1s} + M_{p2s}$ meets the standard, if the conditions are met, proceed to the next step, otherwise, adjust the number of turns of coil and magnetic core distribution of the magnetic coupling mechanism, and repeat the step V;

Step VII: substituting the self-inductance $L_p$ of the transmitting rail and the mutual inductance $M_{p1p2}$ into formula (27), to calculate and analyze the sensitivity of the compensation capacitors, if the sensitivity meets system design requirements, then go to the next step, otherwise, adjust the size, number of turns of coil and magnetic core distribution of the magnetic coupling mechanism, and repeat the step V;

Step VIII: recording all system parameters and completing system parameter design.

The above embodiments are preferred embodiments of the present disclosure, but the embodiments of the present disclosure are not limited to the above embodiments. Any other changes, modifications, substitutions, combinations, and simplifications may be made without departing from the spirit and principle of the present disclosure. All of these should be equivalent substitutions, and fall within the protection scope of the present disclosure.

What is claimed is:

1. A double solenoid electric vehicle dynamic wireless power transfer (EV-DWPT) system, comprising a primary side power conversion assembly, a magnetic coupling mechanism, and a secondary side power conversion assembly, the magnetic coupling mechanism comprising a transmitting structure and a receiving structure, wherein:

the transmitting structure comprises a plurality of double solenoid transmitting rails arranged equidistantly along a road direction, wherein each of the double solenoid transmitting rails comprises a square tubular magnetic core perpendicular to a road surface, an inner energy transmitting solenoid, and an outer energy transmitting solenoid wound spirally on an inner wall and an outer wall of the square tubular magnetic core respectively, wherein the inner energy transmitting solenoid and the outer energy transmitting solenoid use one and the same Litz wire, but are wound in opposite directions;

wherein the receiving structure comprises a hierarchically arranged pickup coil, a receiving-end magnetic core and a metal shielding plate, and the pickup coil is of a square annular structure;

wherein the square tubular magnetic core comprises an inner square tubular magnetic core, a middle square tubular magnetic core and an outer square tubular magnetic core that are partitioned, wherein the inner energy transmitting solenoid is wound on an inner wall of the inner square tubular magnetic core, and the outer energy transmitting solenoid is wound around an outer wall of the outer square tubular magnetic core;

wherein a square protrusion is provided at a center of the receiving-end magnetic core, and the square protrusion fits into a square gap in a center of the pickup coil; wherein the number of turns of the outer energy transmitting solenoid is $n_1$, and the number of turns of the pickup coil is $n_2$, and wherein $n_1$ and $n_2$ are determined by a processor configured through the following steps:

A1: setting a target mutual inductance value $M_{min}$ and a transmission distance h;

A2: with reference to dimensions of the outer square tubular magnetic core and the receiving-end magnetic core, determining a maximum value $(n_1)_{max}$ of $n_1$ and a maximum value $(n_2)_{max}$ of $n_2$;

A3: letting $n_1=n_2=1$, and using finite element simulation software to calculate a mutual inductance M of the magnetic coupling mechanism;

A4: determining whether M is greater than $M_{min}$, if so, utilize the current value of $n_1$ and $n_2$; if not, go to the next step;

A5: adding 1 to $n_2$, that is, $n_2=n_2+1$;

A6: determining whether the current $n_2$ is greater than $(n_2)_{max}$, if not, return to the step A4; if so, proceed to the next step;

A7: letting $n_2=1$, adding 1 to $n_1$, that is, $n_1=n_1+1$;

A8: determining whether the current $n_1$ is greater than $(n_1)_{max}$, if not, return to the step A4.

2. The double solenoid EV-DWPT system according to claim 1, wherein, after $n_1$ and $n_2$ are determined, a coil size of the inner energy transmitting solenoid is determined by the processor configured through the following steps:

B1: determining an initial value of the coil size with reference to a system power level, the number of turns of coils in the transmitting rails and a maximum drop $\Delta M_{max}$ of mutual inductance at offset;

B2: simulating anti-offset characteristics of the system;

B3: analyzing and determining whether the drop $\Delta M$ of mutual inductance at offset is less than $\Delta M_{max}$, if so, utilize the current coil size; if not, adjust the coil size and return to the step B2.

3. The double solenoid EV-DWPT system according to claim 1, wherein, transmitting coils of the inner energy transmitting solenoid and the outer energy transmitting solenoid emission coil, and the pickup coil are all wound and formed from Litz wires with 0.1 mm*1000 strands and 5 mm outer diameter; the square tubular magnetic core and the receiving-end magnetic core are made of a core material selected from PC95 manganese zinc ferrite.

4. The double solenoid EV-DWPT system according to claim 1, wherein, the primary side power conversion assembly comprises DC power supplies connected in sequence, a plurality of high-frequency inverters connected in parallel to the DC power supplies, and first LCC primary side resonant networks and second LCC primary side resonant networks connected in parallel to the high-frequency inverters, the first LCC primary side resonant network and the second LCC primary side resonant network respectively connect two adjacent double solenoid transmitting rails;

the secondary side power conversion assembly comprises a LCC secondary side resonant network, a rectifier filter circuit and a load circuit sequentially connected.

5. The double solenoid EV-DWPT system according to claim 4, wherein resonant inductors in the first LCC primary side resonance network, the second LCC primary side resonance network and the LCC secondary side resonance network are equivalently replaced by an inductor and a capacitor in series connection.

6. The double solenoid EV-DWPT system according to claim 4, wherein a self-inductance value $L_{f1}$ of the resonant inductor in the first LCC primary side resonant network is equal to a self-inductance value $L_{f2}$ of the resonant inductor in the second LCC primary side resonant network, and equal to $L_{f12}$.

7. A parameter optimization method for use with the double solenoid EV-DWPT system according to claim 6, comprising:

Step I: according to system requirements, determining a system input voltage $U_i$, an output load equivalent resistance $R_L$, an output voltage $U_o$ and setting a system operating frequency f;

Step II: with a goal of optimizing efficiency, determining a value of $L_{f3}$ with reference to a wire diameter of the pickup coil, a current expression $I_s=R_{eq}(M_{p1s}+M_{p2s})U_i/\omega^2 L_{f12}L_{f3}^2$ and an output current expression $I_3=(M_{p1s}+M_{p2s})U_i/j\omega L_{f12}L_{f3}$, where $M_{p1s}+M_{p2s}$ is mutual inductance of the pickup coil and two adjacent double solenoid transmitting rails, $\omega=2\pi f$ is an operating angular frequency of the system, and $L_{f3}$ is the self-inductance value of the resonant inductor in the LCC secondary side resonant network;

Step III: determining values of $L_{f1}$ and $L_{f2}$ with reference to a wire diameter of the double solenoid transmitting rails and a current expression $I_p=U_i/\omega L_{fi}$, where i=1,2;

Step IV: setting a system output power $P_o$, and initially determining a value range of the mutual inductance $M_{p1s}+M_{p2s}$, of a rail center area and a rail switching domain of the magnetic coupling mechanism based on an output power expression $$P_o = \frac{(M_{p1s}+M_{p2s})^2 \omega^2 L_{f3}^2 R_{eq}}{L_{f12}^2(\omega^2 L_{f3}^2 + R_{eq}R_s)^2}|U_i|^2,$$

where $R_s$ is an internal resistance of the pickup coil, and $R_{eq}$ is an equivalent resistance equivalent to the rectifier filter circuit and the load circuit;

Step V: using simulation software to optimize a design of the magnetic coupling mechanism, and obtaining $M_{p1s}+M_{p2s}$ and a cross-mutual inductance $M_{p1p2}$ of two adjacent double solenoid transmitting rails through simulation;

Step VI: determining through calculation whether a value of the mutual inductance $M_{p1s}+M_{p2s}$ meets system output power requirements, and qualitatively and quantitatively analyzing whether a fluctuation of $M_{p1s}+M_{p2s}$ meets a standard, if the conditions are met, proceed to the next step, otherwise, adjust the number of turns of coil and magnetic core distribution of the magnetic coupling mechanism, and repeat the step V;

Step VII: substituting the self-inductances $L_{p1}$ and $L_{p2}$ of the two adjacent double solenoid transmitting rails and their mutual inductance $M_{p1p2}$ into a formula $$\begin{cases} C_{p1} = \dfrac{1}{\omega^2(L_{p1} - L_{f1} - M_{p1p2})} \\ C_{p2} = \dfrac{1}{\omega^2(L_{p2} - L_{f2} - M_{p1p2})} \end{cases},$$

to calculate and analyze sensitivity of corresponding series compensation capacitors $C_{p1}$ and $C_{p2}$, if the sensitivity meets system design requirements, then go to the next step, otherwise, adjust the size, number of turns of coil and magnetic core distribution of the magnetic coupling mechanism, and repeat the step V;

Step VIII: recording all system parameters and completing system parameter design.

8. The parameter optimization method of the double solenoid EV-DWPT system according to claim 7, wherein, in the step IV, the rail center area of the magnetic coupling mechanism is directly above the double solenoid transmitting rail, the rail switching domain is an area between two adjacent rail center areas.

\* \* \* \* \*